US011703944B2

(12) United States Patent
Guerra Filho et al.

(10) Patent No.: US 11,703,944 B2
(45) Date of Patent: Jul. 18, 2023

(54) MODIFYING VIRTUAL CONTENT TO INVOKE A TARGET USER STATE

(71) Applicant: Apple Inc., Cupertino, CA (US)

(72) Inventors: Gutemberg B. Guerra Filho, El Dorado Hills, CA (US); Ian M. Richter, Los Angeles, CA (US); Raffi A. Bedikian, Mountain View, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/690,731

(22) Filed: Mar. 9, 2022

(65) Prior Publication Data

US 2022/0197373 A1 Jun. 23, 2022

Related U.S. Application Data

(63) Continuation of application No. 16/859,879, filed on Apr. 27, 2020, now Pat. No. 11,307,650.

(60) Provisional application No. 62/866,129, filed on Jun. 25, 2019.

(51) Int. Cl.
*G06F 3/00* (2006.01)
*G06F 3/01* (2006.01)
*G06N 20/00* (2019.01)

(52) U.S. Cl.
CPC .............. *G06F 3/011* (2013.01); *G06N 20/00* (2019.01); *G06F 2203/011* (2013.01)

(58) Field of Classification Search
CPC .................................. G06F 3/011; G06N 20/00
USPC .......................................................... 345/633
See application file for complete search history.

(56) References Cited

U.S. PATENT DOCUMENTS

2015/0326570 A1\* 11/2015 Publicover .......... G06F 3/04817
382/117
2016/0077547 A1  5/2016 Aimone et al.
2019/0371028 A1 12/2019 Harrises et al.
2020/0078638 A1  3/2020 Statham et al.
2020/0201434 A1  6/2020 Aliamiri \* cited by examiner

*Primary Examiner* — Thomas J Lett
(74) *Attorney, Agent, or Firm* — Fernando & Partners, LLP

(57) ABSTRACT

In one implementation, a method includes: while presenting reference CGR content, obtaining a request from a user to invoke a target state for the user; generating, based on a user model and the reference CGR content, modified CGR content to invoke the target state for the user; presenting the modified CGR content; after presenting the modified CGR content, determining a resultant state of the user; in accordance with a determination that the resultant state of the user corresponds to the target state for the user, updating the user model to indicate that the modified CGR content successfully invoked the target state for the user; and in accordance with a determination that the resultant state of the user does not correspond to the target state for the user, updating the user model to indicate that the modified CGR content did not successfully invoke the target state for the user.

22 Claims, 18 Drawing Sheets

| Dialogue Portion 482 | Dialogue Delivery Portion 484 | Physiological Measurements Portion 486 | Body Pose Portion 488 | Gaze Direction Portion 490 | . . . | Other Portion(s) 492 |

470

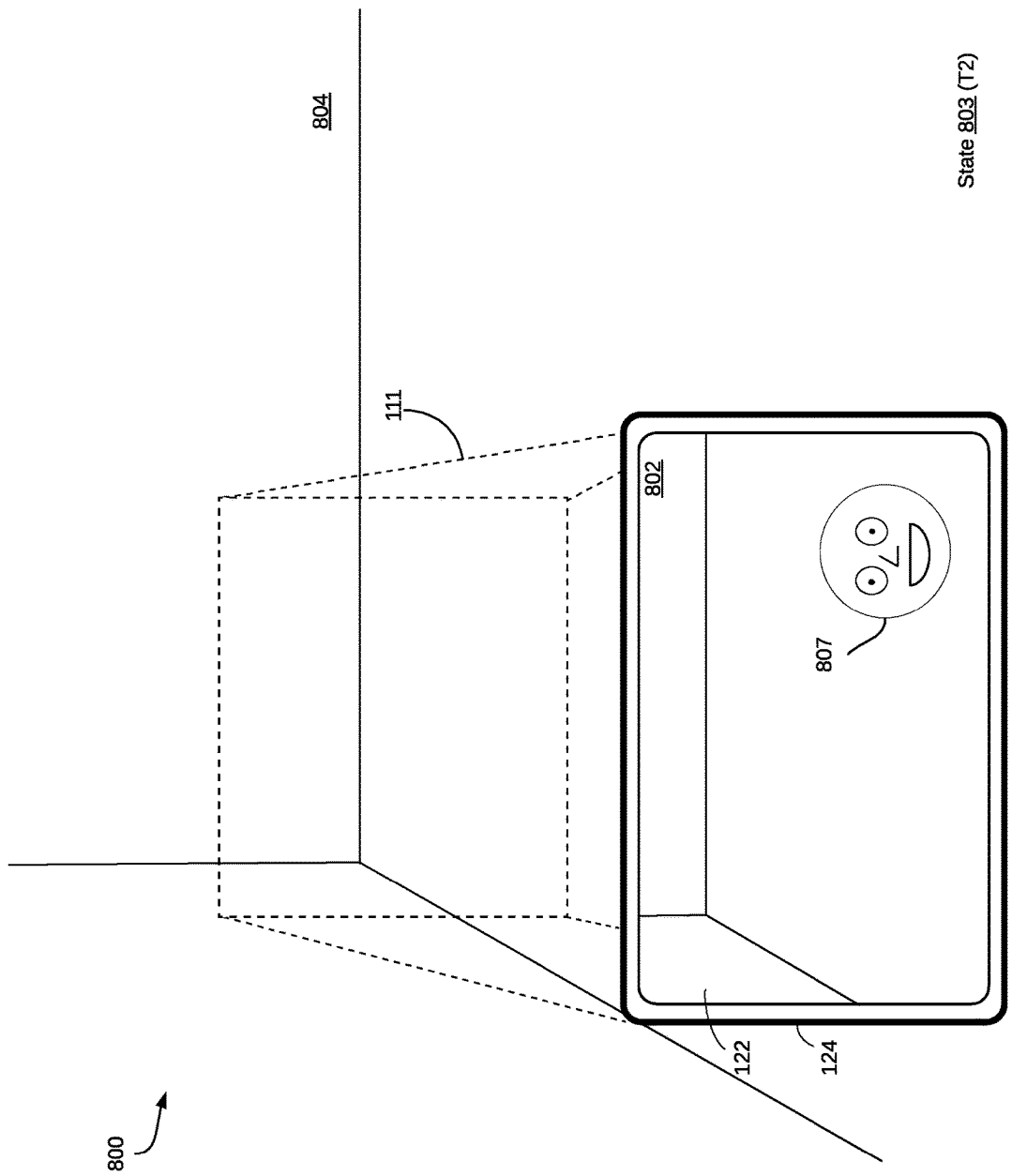

MODIFYING VIRTUAL CONTENT TO INVOKE A TARGET USER STATE

CROSS-REFERENCE TO RELATED APPLICATIONS

This application claims the benefit of U.S. Provisional Patent App. No. 62/866,129, filed on Jun. 25, 2019, and U.S. Non-Provisional patent application Ser. No. 16/859,879, filed on Apr. 27, 2020, which are incorporated by reference in their entireties.

TECHNICAL FIELD

The present disclosure generally relates to modifying virtual content (sometimes also referred to herein as "computer-generated reality (CGR) content") and, in particular, to systems, methods, and methods for modifying and presenting virtual content in order to invoke a target state of a user.

BACKGROUND

Virtual reality (VR) and augmented reality (AR) are becoming more popular due to their remarkable ability to alter a user's perception of the world. For example, VR and AR are used for learning purposes, gaming purposes, content creation purposes, social media and interaction purposes, or the like. These technologies differ in the user's perception of his/her presence. VR transposes the user into a virtual space, so their VR perception is different from his/her real-world perception. In contrast, AR takes the user's real-world perception and adds something to it.

These technologies are becoming more commonplace due to, for example, miniaturization of hardware components, improvements to hardware performance, and improvements to software efficiency. As one example, a user may experience AR content superimposed on a live video feed of the user's setting on a handheld display (e.g., an AR-enabled mobile phone or tablet with video pass-through). As another example, a user may experience AR content by wearing a near-eye system or head-mounted enclosure that still allows the user to see his/her surroundings (e.g., glasses with optical see-through). As yet another example, a user may experience VR content by using a near-eye system that encloses the user's field-of-view and is tethered to a computer.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIGS. 8A-8C illustrate an example CGR presentation scenario for generating and presenting CGR content to invoke a target state of a user in accordance with some implementations.

Figure 1:
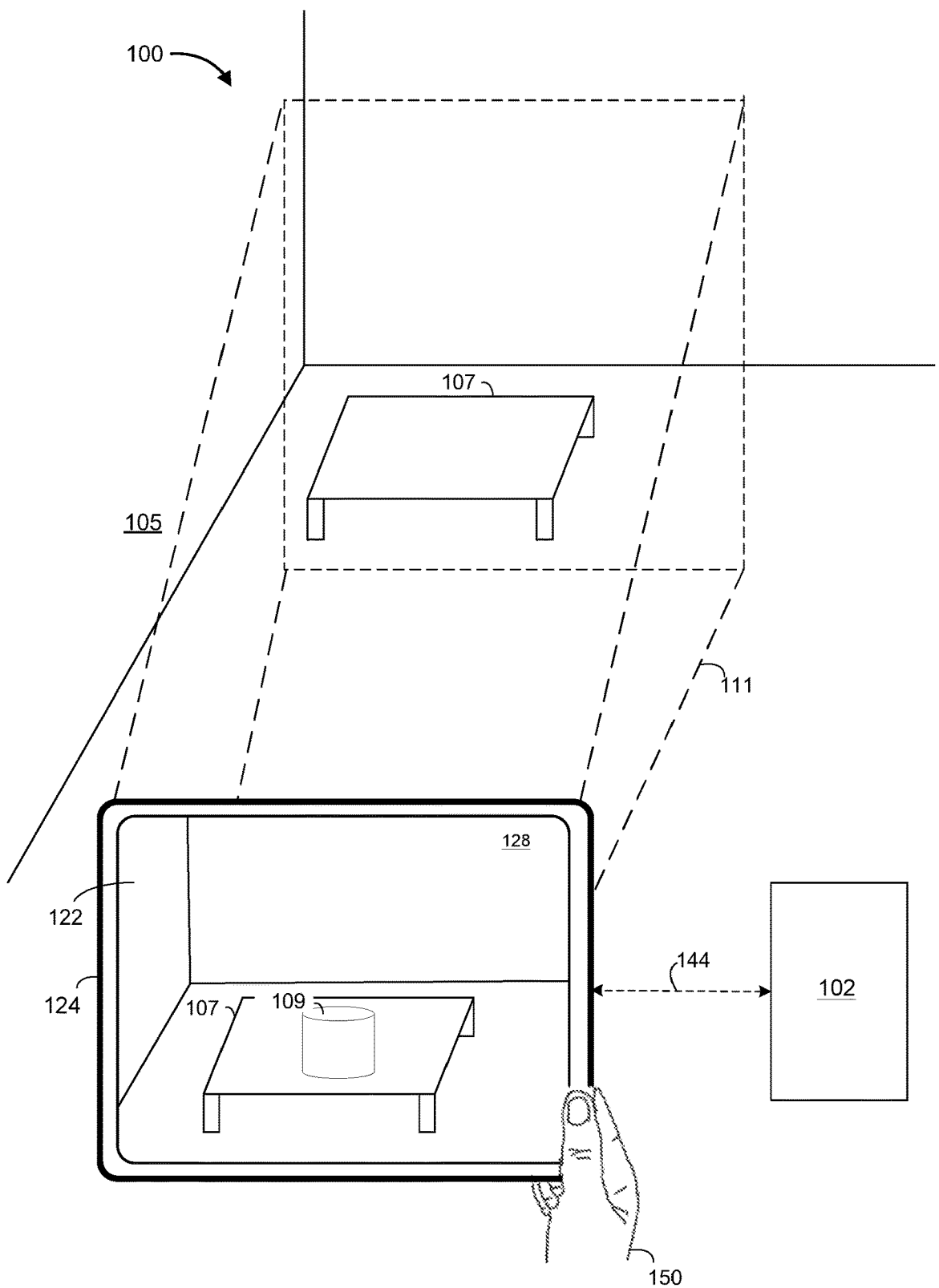
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for generating and presenting computer-generated reality (CGR) content in order to invoke a target state of a user using historical information associated with the user. According to some implementations, the method is performed at an electronic device including one or more processors, a non-transitory memory, and one or more displays. The method includes: while presenting reference CGR content via the one or more displays, obtaining a request from a user to invoke a target state for a user; generating, based on a user model associated with the user and the reference CGR content, modified CGR content to invoke the target state for the user, wherein the user model provides projected reactions to CGR content; and presenting, via the one or more displays, the modified CGR content.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more CGR objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of CGR object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real-world objects (that is, physical articles from the physical environment or representations thereof). For example, a system may account for movements so that a virtual tree appears stationery with respect to the physical ground.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include near-eye systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A near-eye system may have one or more speaker(s) and an integrated opaque display. Alternatively, a near-eye system may be configured to accept an external opaque display (e.g., a smartphone). The near-eye system may incorporate one or more imaging sensors to capture images or video of the physical environment, and/or one or more microphones to capture audio of the physical environment. Rather than an opaque display, a near-eye system may have a transparent or translucent display. The display may utilize digital light projection, micro-electromechanical systems (MEMS), digital micromirror devices (DMDs), organic light-emitting diodes (OLEDs), light-emitting diodes (LEDs), micro-light-emitting diodes (µLEDs), liquid crystal on silicon (LCoS), laser scanning light source, or any combination of these technologies. The medium may be an optical waveguide, a hologram medium, an optical combiner, an optical reflector, or any combination thereof. In one implementation, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 102 and an electronic device 124 (e.g., a tablet, mobile phone, laptop, wearable computing device, or the like).

In some implementations, the controller 102 is configured to manage and coordinate a CGR experience for a user 150 (sometimes also referred to herein as a "CGR environment") and zero or more other users. In some implementations, the controller 102 includes a suitable combination of software, firmware, and/or hardware. The controller 102 is described in greater detail below with respect to FIG. 11. In some implementations, the controller 102 is a computing device that is local or remote relative to the physical environment 105. For example, the controller 102 is a local server located within the physical environment 105. In another example, the controller 102 is a remote server located outside of the physical environment 105 (e.g., a cloud server, central server, etc.). In some implementations, the controller 102 is communicatively coupled with the electronic device 124 via one or more wired or wireless communication channels 144 (e.g., BLUETOOTH, IEEE 802.11x, IEEE 802.16x, IEEE 802.3x, etc.). In some implementations, the functions of the controller 102 are provided by the electronic device 124. As such, in some implementations, the components of the controller 102 are integrated into the electronic device 124.

In some implementations, the electronic device 124 is configured to present audio and/or video content to the user 150. In some implementations, the electronic device 124 is configured to present the CGR environment 128 to the user 150. In some implementations, the electronic device 124 includes a suitable combination of software, firmware, and/or hardware. The electronic device 124 is described in greater detail below with respect to FIG. 12.

According to some implementations, the electronic device 124 presents a computer-generated reality (CGR) experience to the user 150 while the user 150 is physically present within a physical environment 105 that includes a table 107 within the field-of-view 111 of the electronic device 124. As such, in some implementations, the user 150 holds the electronic device 124 in his/her hand(s). In some implementations, while presenting the CGR experience, the electronic device 124 is configured to present CGR content (e.g., a CGR cylinder 109) and to enable video pass-through of the physical environment 105 (e.g., including the table 107) on a display 122. For example, the electronic device 124 corresponds to a mobile phone, tablet, laptop, wearable computing device, or the like.

In some implementations, the display 122 corresponds to an additive display that enables optical see-through of the physical environment 105 including the table 107. For example, the display 122 correspond to a transparent lens, and the electronic device 124 corresponds to a pair of glasses worn by the user 150. As such, in some implementations, the electronic device 124 presents a user interface by projecting the CGR content (e.g., the CGR cylinder 109) onto the additive display, which is, in turn, overlaid on the physical environment 105 from the perspective of the user 150. In some implementations, the electronic device 124 presents the user interface by displaying the CGR content (e.g., the CGR cylinder 109) on the additive display, which is, in turn, overlaid on the physical environment 105 from the perspective of the user 150.

In some implementations, the user 150 wears the electronic device 124 such as a near-eye system. As such, the electronic device 124 includes one or more displays provided to display the CGR content (e.g., a single display or one for each eye). For example, the electronic device 124 encloses the field-of-view of the user 150. In such implementations, the electronic device 124 presents the CGR environment 128 by displaying data corresponding to the CGR environment 128 on the one or more displays or by projecting data corresponding to the CGR environment 128 onto the retinas of the user 150.

In some implementations, the electronic device 124 includes an integrated display (e.g., a built-in display) that displays the CGR environment 128. In some implementations, the electronic device 124 includes a head-mountable enclosure. In various implementations, the head-mountable enclosure includes an attachment region to which another device with a display can be attached. For example, in some implementations, the electronic device 124 can be attached to the head-mountable enclosure. In various implementations, the head-mountable enclosure is shaped to form a receptacle for receiving another device that includes a display (e.g., the electronic device 124). For example, in some implementations, the electronic device 124 slides/snaps into or otherwise attaches to the head-mountable enclosure. In some implementations, the display of the device attached to the head-mountable enclosure presents (e.g., displays) the CGR environment 128. In some implementations, the electronic device 124 is replaced with a CGR chamber, enclosure, or room configured to present CGR content in which the user 150 does not wear the electronic device 124.

In some implementations, the controller 102 and/or the electronic device 124 cause a CGR representation of the user 150 to move within the CGR environment 128 based on movement information (e.g., body pose data, eye tracking data, hand tracking data, etc.) from the electronic device 124 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 102 and/or the electronic device 124 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
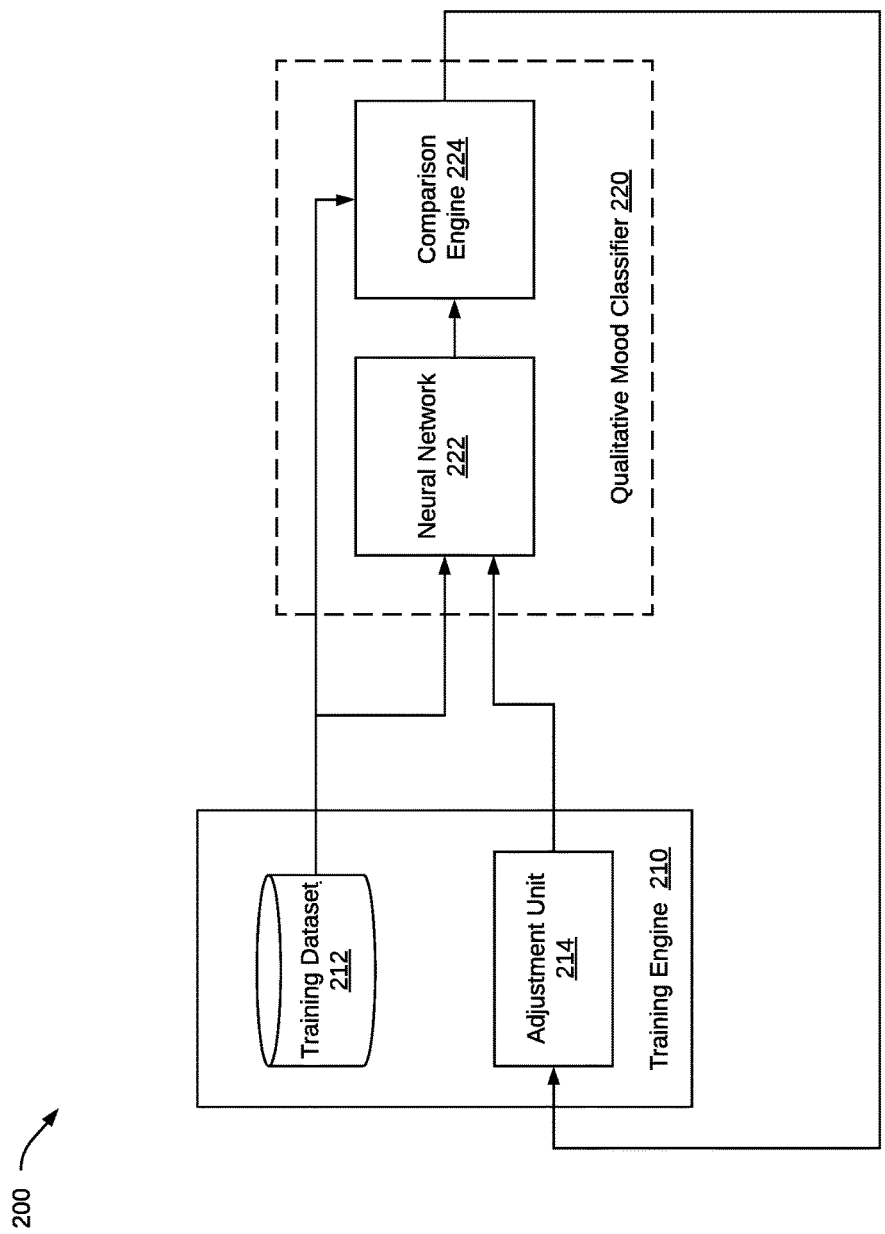
FIG. 2 is a block diagram of a training implementation of a mood classification engine in accordance with some implementations.

FIG. 2 is a block diagram of a training implementation of an example data processing architecture 200 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data processing architecture 200 (e.g., the training implementation) includes the training engine 210 and a qualitative mood classifier 220. In some implementations, the training engine 210 includes at least a training dataset 212 and an adjustment unit 214. In some implementations, the qualitative mood classifier 220 includes at least a machine learning system such as neural network 222 (e.g., a convolutional neural network (CNN) 300 shown in FIG. 3) and a comparison engine 224. To that end, as a non-limiting example, the data processing architecture 200 is included in the controller 102 shown in FIGS. 1 and 11; the electronic device 124 shown in FIGS. 1 and 12; and/or a suitable combination thereof.

In some implementations, in a training mode, the data processing architecture 200 is configured to train the qualitative mood classifier 220 based at least in part on the training dataset 212. In some implementations, the training dataset 212 at least includes known states for the user (e.g., the user 150 shown in FIG. 1) and a corresponding plurality of sensor information sets that include at least audio data, physiological data, body pose data, eye tracking data, and/or the like that characterize the known state for the user. As a non-limiting example, a suite of sensor data associated with a known state for the user that corresponds to a state of happiness includes: audio data that indicates a speech characteristic of a slow speech cadence, physiological data that includes a heart rate of 90 beats-per-minute (BPM), pupil eye diameter of 3.0 mm, body pose data of the user with his or her arms wide open, and/or eye tracking data of a gaze focused on a particular subject. As another non-limiting example, a suite of sensor data associated with a known state for the user that corresponds to a state of stress includes: audio data that indicates a speech characteristic associated with a stammering speech pattern, physiological data that includes a heart rate beat of 120 BPM, pupil eye dilation diameter of 7.00 mm, body pose data of the user with his or her arms crossed, and/or eye tracking data of a shifty eye gaze. As yet another example, a suite of sensor data associated with a known state for the user that corresponds to a state of calmness includes: audio data that includes a transcript saying "I am relaxed," audio data that indicates slow speech pattern, physiological data that includes a heart rate of 80 BPM, pupil eye dilation diameter of 4.0 mm, body pose data of arms folded behind the head of the user, and/or eye tracking data of a relaxed gaze.

In some implementations, the training engine 210 determines whether a difference between a candidate qualitative mood indicator corresponding to the user and a known qualitative mood indicator for the current training sample satisfies an error metric. In some implementations, the error metric corresponds to a preset or deterministic error threshold that should be satisfied before training is complete for the particular sample or overall. In some implementations, the training engine 210 or a component thereof (e.g., the adjustment unit 214) adjusts operating values (e.g., neural/filter weights) of one or more portions of the neural network 222 based at least in part on a determination, by a comparison engine 224, that the difference between the candidate qualitative mood indicator corresponding to the user and the known qualitative mood indicator for the current training sample satisfies the error metric. In response to determining that the result of the comparison between the candidate mood indicator corresponding to the user against the known qualitative mood indicator for the current training sample satisfies the error metric and that a sufficient portion of the training dataset 212 is utilized, the electronic device 124 outputs a convergence indicator associated with the qualitative mood classifier 220. After the training engine 210 trains the neural network 222, the trained neural network (e.g., the trained neural network 516 shown in FIG. 5) may begin to operate in a run-time mode.

Although the training engine 210, the training dataset 212, the adjustment unit 214, the qualitative mood classifier 220, the neural network 222, and the comparison engine 224 are shown as residing on a single device (e.g., the data processing architecture 200), it should be understood that in other implementations, any combination of the training engine 210, the training dataset 212, the adjustment unit 214, the qualitative mood classifier 220, the neural network 222, and the comparison engine 224 may be located in separate computing devices.

Moreover, FIG. 2 is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
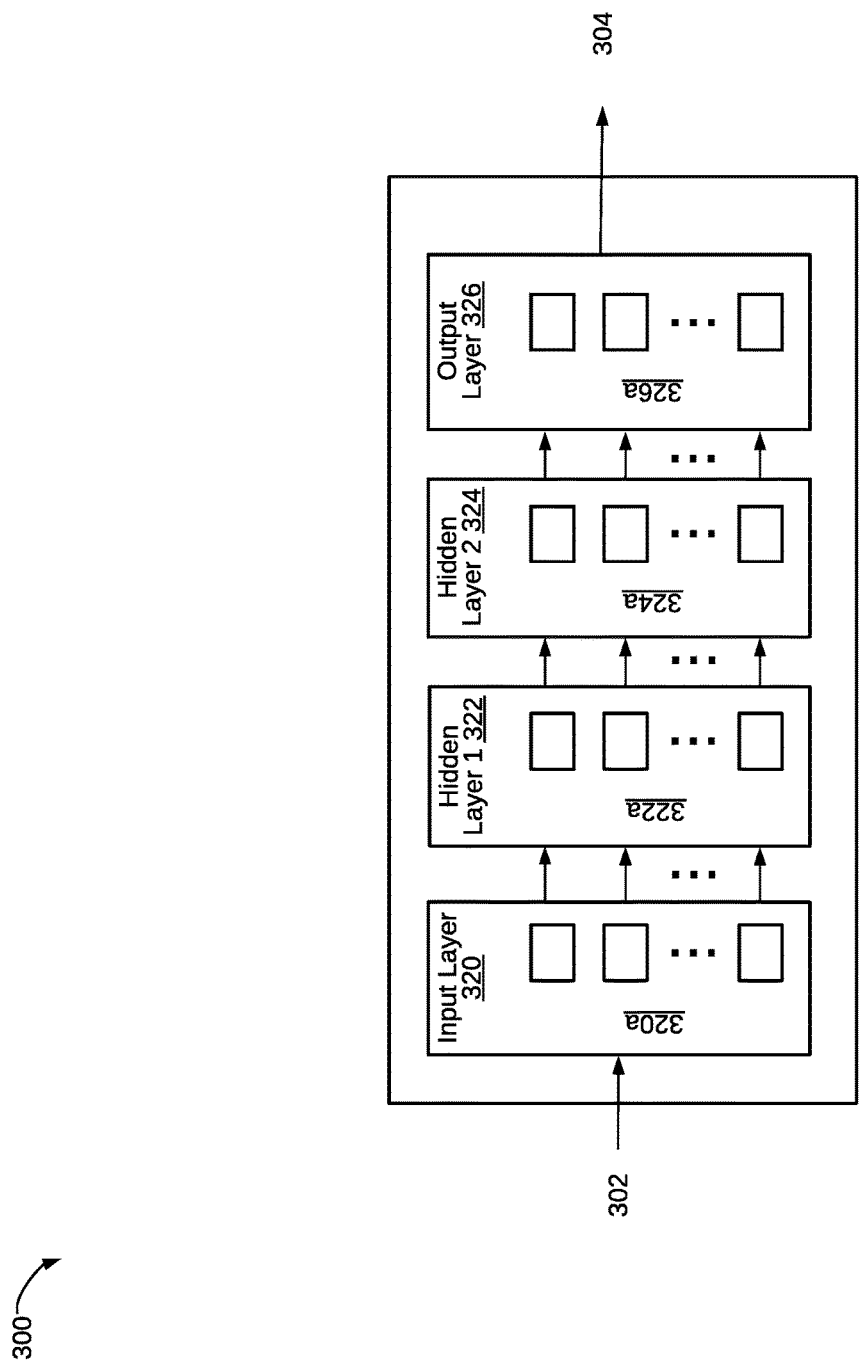
FIG. 3 is a block diagram of an example neural network in accordance with some implementations.

FIG. 3 is a block diagram of an example neural network 300 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the neural network 300 includes an input layer 320, a first hidden layer 322, a second hidden layer 324, and an output layer 326. While the neural network 300 includes two hidden layers as an example, those of ordinary skill in the art will appreciate from the present disclosure that one or more additional hidden layers are also present in various implementations. Adding additional hidden layers adds to the computational complexity and memory demands but may improve performance for some applications.

Figure 4A:
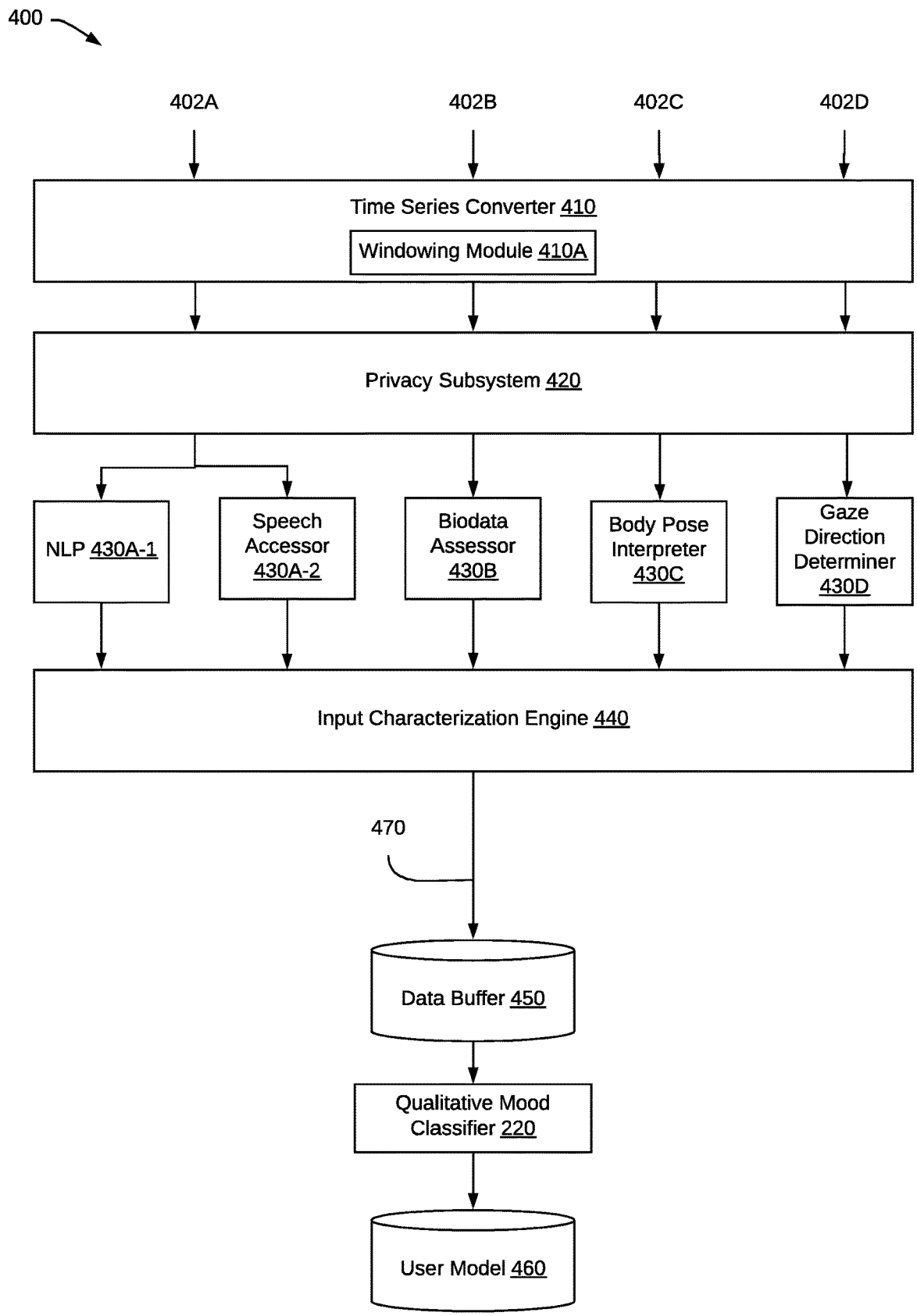
FIG. 4A is a block diagram of an example data processing architecture in accordance with some implementations.
Figure 4B:
FIG. 4B illustrates an example input characterization vector in accordance with some implementations.

In various implementations, the input layer 320 is coupled (e.g., configured) to receive an input characterization vector 302 (e.g., the input characterization vector 470 shown in FIG. 4B). The features and components of the input characterization vector 302 are described below in greater detail with respect to FIG. 4B. For example, the input layer 320 receives the input characterization vector 302 from an input characterization engine (e.g., the input characterization engine 440 shown in FIG. 4A). In various implementations, the input layer 320 includes a number of long short-term memory (LSTM) logic units 320a, which are also referred to as model(s) of neurons by those of ordinary skill in the art. In some such implementations, an input matrix from the features to the LSTM logic units 320a include rectangular matrices. For example, the size of this matrix is a function of the number of features included in the feature stream.

In some implementations, the first hidden layer 322 includes a number of LSTM logic units 322a. In some implementations, the number of LSTM logic units 322a ranges between approximately 10-500. As illustrated in the example of FIG. 3, the first hidden layer 322 receives its inputs from the input layer 320. For example, the first hidden layer 322 performs one or more of following: a convolutional operation, a nonlinearity operation, a normalization operation, a pooling operation, and/or the like.

In some implementations, the second hidden layer 324 includes a number of LSTM logic units 324a. In some implementations, the number of LSTM logic units 324a is the same as or similar to the number of LSTM logic units 320a in the input layer 320 or the number of LSTM logic units 322a in the first hidden layer 322. As illustrated in the example of FIG. 3, the second hidden layer 324 receives its inputs from the first hidden layer 322. Additionally, and/or alternatively, in some implementations, the second hidden layer 324 receives its inputs from the input layer 320. For example, the second hidden layer 324 performs one or more of following: a convolutional operation, a nonlinearity operation, a normalization operation, a pooling operation, and/or the like.

In some implementations, the output layer 326 includes a number of LSTM logic units 326a. In some implementations, the number of LSTM logic units 326a is the same as or similar to the number of LSTM logic units 320a in the input layer 320, the number of LSTM logic units 322a in the first hidden layer 322, or the number of LSTM logic units 324a in the second hidden layer 324. In some implementations, the output layer 326 is a task-dependent layer that performs a computer vision related task such as feature extraction, object recognition, object detection, pose estimation, or the like. In some implementations, the output layer 326 includes an implementation of a multinomial logistic function (e.g., a soft-max function) that produces a resultant state 304 (otherwise known as the user's reaction to the modified CGR content displayed by the electronic device 124).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

FIG. 4A illustrates an example data processing architecture 400 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the data processing architecture 400 is included in the controller 102 shown in FIGS. 1 and 11; the electronic device 124 shown in FIGS. 1 and 12; and/or a suitable combination thereof.

As shown in FIG. 4A, after the electronic device 124 presents CGR content that is modified from reference CGR content to the user 150, the data processing architecture 400 (e.g., the run-time implementation) obtains input data (e.g., sensor data) associated with a plurality of modalities, including audio data 402A, physiological measurements 402B, body pose data 402C, and eye tracking data 402D. For example, the audio data 402A corresponds to audio signals captured by one or more microphones of the controller 102, the electronic device 124, and/or the optional remote input devices. For example, the physiological measurements 402B correspond to information captured by one or more sensors of the electronic device 124 or a wearable electronic device communicatively coupled with the electronic device 124. For example, the body pose data 402C corresponds to images captured by one or more image sensors of the controller 102, the electronic device 124, and/or the optional remote input devices. For example, the eye tracking data 402D corresponds to images captured by one or more image sensors of the controller 102, the electronic device 124, and/or the optional remote input devices.

According to some implementations, the audio data 402A corresponds to an ongoing or continuous time series of values. In turn, the time series converter 410 is configured to generate one or more temporal frames of audio data from a continuous stream of audio data. Each temporal frame of audio data includes a temporal portion of the audio data 402A. In some implementations, the time series converter 410 includes a windowing module 410A that is configured to mark and separate one or more temporal frames or portions of the audio data 402A for times $T_1, T_2, \ldots, T_N$.

In some implementations, each temporal frame of the audio data 402A is conditioned by a pre-filter (not shown).

For example, in some implementations, pre-filtering includes band-pass filtering to isolate and/or emphasize the portion of the frequency spectrum typically associated with human speech. In some implementations, pre-filtering includes pre-emphasizing portions of one or more temporal frames of the audio data in order to adjust the spectral composition of the one or more temporal frames of the audio data 402A. Additionally, and/or alternatively, in some implementations, the windowing module 410A is configured to retrieve the audio data 402A from a non-transitory memory. Additionally, and/or alternatively, in some implementations, pre-filtering includes filtering the audio data 402A using a low-noise amplifier (LNA) in order to substantially set a noise floor for further processing. In some implementations, a pre-filtering LNA is arranged prior to the time series converter 410. Those of ordinary skill in the art will appreciate that numerous other pre-filtering techniques may be applied to the audio data, and those highlighted herein are merely examples of numerous pre-filtering options available.

According to some implementations, the physiological measurements 402B corresponds to an ongoing or continuous time series of values. In turn, the time series converter 410 is configured to generate one or more temporal frames of physiological measurement data from a continuous stream of physiological measurement data. Each temporal frame of physiological measurement data includes a temporal portion of the physiological measurements 402B. In some implementations, the time series converter 410 includes a windowing module 410A that is configured to mark and separate one or more portions of the physiological measurements 402B for times $T_1, T_2, \ldots, T_N$. In some implementations, each temporal frame of the physiological measurements 402B is conditioned by a pre-filter or otherwise pre-processed (not shown).

According to some implementations, the body pose data 402C corresponds to an ongoing or continuous time series of images or values. In turn, the time series converter 410 is configured to generate one or more temporal frames of body pose data from a continuous stream of body pose data. Each temporal frame of body pose data includes a temporal portion of the body pose data 402C. In some implementations, the time series converter 410 includes a windowing module 410A that is configured to mark and separate one or more temporal frames or portions of the body pose data 402C for times $T_1, T_2, \ldots, T_N$. In some implementations, each temporal frame of the body pose data 402C is conditioned by a pre-filter or otherwise pre-processed (not shown).

According to some implementations, the eye tracking data 402D corresponds to an ongoing or continuous time series of images or values. In turn, the time series converter 410 is configured to generate one or more temporal frames of eye tracking data from a continuous stream of eye tracking data. Each temporal frame of eye tracking data includes a temporal portion of the eye tracking data 402D. In some implementations, the time series converter 410 includes a windowing module 410A that is configured to mark and separate one or more temporal frames or portions of the eye tracking data 402D for times $T_1, T_2, \ldots, T_N$. In some implementations, each temporal frame of the eye tracking data 402D is conditioned by a pre-filter or otherwise pre-processed (not shown).

In various implementations, the data processing architecture 400 includes a privacy subsystem 420 that includes one or more privacy filters associated with user information and/or identifying information (e.g., at least some portions of the audio data 402A, the physiological measurements 402B, the body pose data 402C, and/or the eye tracking data 402D). In some implementations, the privacy subsystem 420 includes an opt-in feature where the device informs the user as to what user information and/or identifying information is being monitored and how the user information and/or the identifying information will be used. In some implementations, the privacy subsystem 420 selectively prevents and/or limits the data processing architecture 400 or portions thereof from obtaining and/or transmitting the user information. To this end, the privacy subsystem 420 receives user preferences and/or selections from the user in response to prompting the user for the same. In some implementations, the privacy subsystem 420 prevents the data processing architecture 400 from obtaining and/or transmitting the user information unless and until the privacy subsystem 420 obtains informed consent from the user. In some implementations, the privacy subsystem 420 anonymizes (e.g., scrambles or obscures) certain types of user information. For example, the privacy subsystem 420 receives user inputs designating which types of user information the privacy subsystem 420 anonymizes. As another example, the privacy subsystem 420 anonymizes certain types of user information likely to include sensitive and/or identifying information, independent of user designation (e.g., automatically).

In some implementations, the natural language processor (NLP) 430A-1 is configured to perform natural language processing (or another speech recognition technique) on the audio data 402A or one or more temporal frames thereof. For example, the NLP 430A-1 includes a processing model (e.g., a hidden Markov model, a dynamic time warping algorithm, or the like) or a machine learning node (e.g., a CNN, recurrent neural network (RNN), deep neural network (DNN), state vector machine (SVM), random forest algorithm, or the like) that performs speech-to-text (STT) processing. In some implementations, the electronic device 124 and/or the controller 102 uses the text output by the NLP 430A-1 to help determine a resultant state of the user 150.

In some implementations, the speech assessor 430A-2 is configured to determine one or more speech characteristics associated with the audio data 402A (or one or more temporal frames thereof). For example, the one or more speech characteristics corresponds to intonation, cadence, accent, diction, articulation, pronunciation, and/or the like. For example, the speech assessor 430A-2 performs speech segmentation on the audio data 402A in order to break the audio data 402A into words, syllables, phonemes, and/or the like and, subsequently, determines one or more speech characteristics therefor. In some implementations, the electronic device 124 and/or the controller 102 uses the one or more speech characteristics output by the speech assessor 430A-2 to help determine the resultant state of the user 150.

In some implementations, the biodata assessor 430B is configured to assess biological-related data from the user in order to determine one or more physiological measurements associated with the user. For example, the one or more physiological measurements corresponds to heartbeat information, pupil dilation information, glucose level, blood oximetry levels, and/or the like. For example, the biodata assessor 430B performs segmentation on the physiological measurements 402B in order to break the physiological measurements 402B into heart-beat measurements, pupil dilation diameter measurements, glucose levels, blood oximetry, and/or the like, and, subsequently determines one or more physiological measurements therefor. In some implementations, the electronic device 124 and/or the controller 102 uses the one or more physiological measurements output by the biodata assessor 430B to help determine the resultant state of the user.

In some implementations, the body pose interpreter 430C is configured to determine one or more pose characteristics associated with the body pose data 402C (or one or more temporal frames thereof). For example, the body pose interpreter 430C determines an overall pose of the user (e.g., sitting, standing, crouching, etc.) for each sampling period (e.g., each image within the body pose data 402C) or predefined set of sampling periods (e.g., every N images within the body pose data 402C). For example, the body pose interpreter 430C determines rotational and/or translational coordinates for each joint, limb, and/or body portion of the user for each sampling period (e.g., each image within the body pose data 402C) or predefined set of sampling periods (e.g., every N images within the body pose data 402C). For example, the body pose interpreter 430C determines rotational and/or translational coordinates for specific body parts (e.g., head, hands, and/or the like) for each sampling period (e.g., each image within the body pose data 402C) or predefined set of sampling periods (e.g., every N images within the body pose data 402C). In some implementations, the electronic device 124 and/or the controller 102 uses the one or more pose characteristics output by the body pose interpreter 430C to help determine the resultant state of the user 150.

In some implementations, the gaze direction determiner 430D is configured to determine a directionality vector associated with the eye tracking data 402D (or one or more temporal frames thereof). For example, the gaze direction determiner 430D determines a directionality vector (e.g., X, Y, and/or focal point coordinates) for each sampling period (e.g., each image within the eye tracking data 402D) or predefined set of sampling periods (e.g., every N images within the eye tracking data 402D). In some implementations, the electronic device 124 and/or the controller 102 uses the directionality vector output by the gaze direction determiner 430D to help determine the resultant state of the user.

In some implementations, an input characterization engine 440 is configured to generate an input characterization vector 470 shown in FIG. 4B (e.g., similar to the input characterization vector 302 in FIG. 3) based on the outputs from the NLP 430A-1, the speech assessor 430A-2, the biodata assessor 430B, the body pose interpreter 430C, and the gaze direction determiner 430D. As shown in FIG. 4B, the input characterization vector 470 includes a dialogue portion 482 shown in FIG. 4B that corresponds to the output from the NLP 430A-1. For example, the dialogue portion may correspond to a user saying "Wow, I am stressed out," that indicates that the output from the NLP 430A-1 corresponds to a state of stress.

In some implementations, the input characterization vector 470 includes a dialogue delivery portion 484 that corresponds to the output from the speech assessor 430A-2. For example, a speech characteristic associated with a fast speech cadence may indicate that the output from the speech assessor 430A-2 corresponds to a state of nervousness. As another example, a speech characteristic associated with a slow speech cadence may indicate that the output from the speech assessor 430A-2 corresponds to a state of tiredness. As yet another example, a speech characteristic associated with a normal-paced speech cadence may indicate that the output from the speech assessor 430A-2 corresponds to a state of concentration.

In some implementations, the input characterization vector 470 includes a physiological measurements portion 486 that corresponds to the output from the biodata assessor 430B. In some implementations, the input characterization vector 470 includes a body pose portion 488 that corresponds to the output from the body pose interpreter 430C. For example, a body pose characteristic associated with the body pose of a user as crossing his arms may indicate that the output from the biodata assessor 430B corresponds to a state of agitation. As another example, the body pose characteristic associated with the body pose of a user as dancing may indicate that the output from the biodata assessor 430B corresponds to a state of happiness. As yet another example, the body pose characteristic associated with the body pose of a user as crossing his arms behind his head may indicate that the output from the biodata assessor 430B corresponds to a state of relaxation.

In some implementations, the input characterization vector 470 includes a gaze direction portion 490 that corresponds to the output from the gaze direction determiner 430D. For example, the gaze direction portion corresponds to a vector indicating what the user is looking at such that the resultant state of the user may be scared if the user is not focused on a particular object. As another example, the gaze direction portion may indicate that the resultant state of the user may be concentration if the user is focused on a particular object.

In some implementations, the electronic device 124 generates the input characterization vector 470 and stores the input characterization vector 470 in a data buffer 450 (e.g., a non-transitory memory), which is accessible to the qualitative mood classifier 220.

In some implementations, the qualitative mood classifier 220 (e.g., the trained neural network 516) is configured to output a mood or resultant state of the user based on the input characterization vector 470 that includes information derived from the input data (e.g., the audio data 402A, the physiological measurements 402B, the body pose data 402C, and the eye tracking data 402D). In some implementations, each portion of the input characterization vector 470 is associated with a different input modality—dialogue portion, dialogue delivery portion, biodata portion, body pose portion, gaze direction portion, or the like. In some implementations, an error metric is satisfied when the one or more portions of the input characterization vector are within acceptability thresholds. The features and components of the input characterization vector 470 are described below in greater detail with respect to FIG. 4B. For example, each portion (e.g., dialogue portion, dialogue delivery portion, biodata portion, body pose portion, gaze direction portion, or the like) may be associated with a different acceptability threshold. In some implementations, the electronic device 124 stores the resultant state 304 or the resultant reaction of the user 150 to the modified CGR content from the qualitative mood classifier 220 in the user model 460.

In some implementations, the user model 460 is a data structure configured to correlate CGR content to past and/or projected reactions of the user. In some implementations, the user model 460 includes information corresponding to physiological measurements such as heart rate, pupil dilation diameter, eye tracking, glucose level, sleep tracking; dialogue; dialogue delivery; body pose portion; gaze direction portion, or the like. The features and components of the user model is described in greater detail below with respect to FIG. 7.

Moreover, FIG. 4A is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 4A could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

FIG. 4B illustrates an example input characterization vector 470 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein.

As shown in FIG. 4B, the example input characterization vector 470 also includes a dialogue portion 482 corresponding to speech-to-text output associated with audio data collected from a user. As shown in FIG. 4B, the example input characterization vector 470 further includes a dialogue delivery portion 484 associated with one or more speech characteristics (e.g., intonation, cadence, accent, diction, articulation, pronunciation, and/or the like) associated with the audio data collected from the user. In some implementations, the example input characterization vector 470 further includes a physiological measurements portion 486 associated with one or more physiological measurements associated with the user. For example, the one or more physiological measurements may correspond to heart-beat information, pupil dilation information, glucose level, blood oximetry, and/or the like for the user. In some implementations, the example input characterization vector 470 further includes a body pose portion 488 associated with one or more pose characteristics associated with the user. For example, the one or more pose characteristics correspond to an overall pose of the user for each joint, limb, and/or body portion of the user. As yet another example, the one or more pose characteristics correspond to rotational and/or translational coordinates for specific body parts (e.g., head, hands, and/or the like) of the user. In some implementations, the example input characterization vector 470 further includes a gaze direction portion 490 associated with a directionality vector (e.g., X, Y, and/or focal point coordinates) for the gaze of the user.

As shown in FIG. 4B, the example input characterization vector 470 further includes one or more other portion(s) 492 characterizing the user. Those of ordinary skill in the art will appreciate from the present disclosure that the input characterization vector 470 may include other sub-divisions, identifiers, and/or portions in various implementations.

Figure 5:
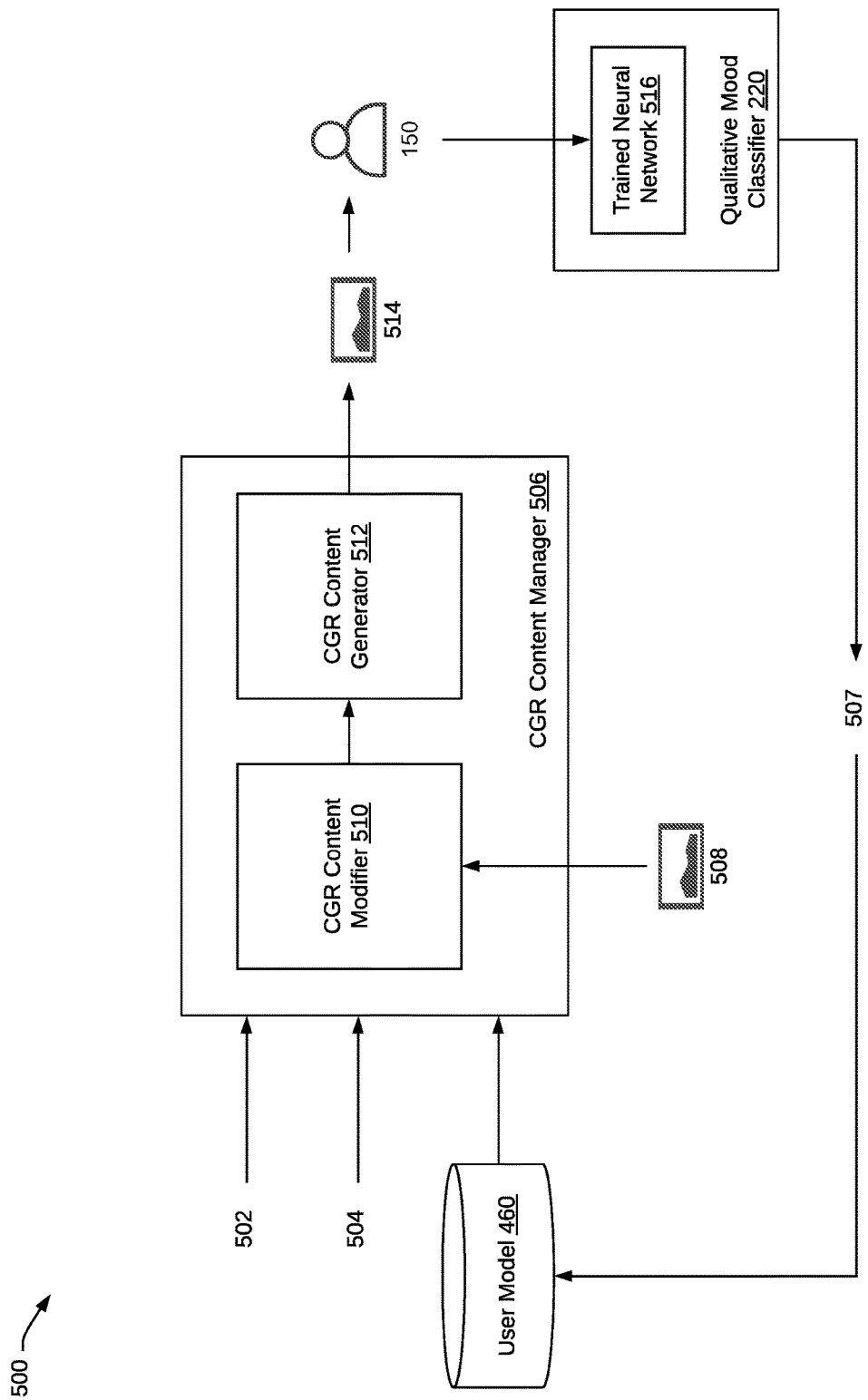
FIG. 5 is a block diagram of a run-time implementation of a qualitative mood classifier in accordance with some implementations.

FIG. 5 is a block diagram of a run-time implementation of the qualitative mood classifier 220 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, the data processing architecture 500 (e.g., the run-time implementation) includes the user model 460, a CGR content manager 506 that includes a CGR content modifier 510 and a CGR content generator 512, CGR content 508, and the qualitative mood classifier 220 that includes a trained neural network 516. To that end, as a non-limiting example, the data processing architecture 500 is included in the controller 102 shown in FIGS. 1 and 11; the electronic device 124 shown in FIGS. 1 and 12; and/or a suitable combination thereof.

In some implementations, in a run-time mode, the data processing architecture 500 is configured to obtain a request from the user 150 to invoke a target state 502 for the user 150 and generate, based on the user model 460 associated with the user 150 and the CGR content 508, modified CGR content 514 intended to invoke the target state 502 for the user 150. In some implementations, the target state 502 corresponds to an emotional state such as being scared, happy, sad, or the like. Those of ordinary skill in the art will appreciate that there are many different target states. For the sake of brevity, an exhaustive listing of all such target states is not provided therein.

Specifically, in some implementations, the CGR content manager 506 is configured to modify and generate modified CGR content 514 based at least in part on the target state 502, a measured state 504 (e.g., the current state of the user 150 prior to CGR modification), and the user model 460. In some implementations, the CGR content modifier 510 modifies the CGR content 508 in order to invoke a target state 502 for the user 150. In some implementations, the modified CGR content 514 corresponds to predetermined CGR content. In some implementations, the CGR content modifier 510 generates modified CGR content 514 based on the target state 502 of the user 150. In some implementations, the modified CGR content 514 corresponds to emergent CGR content. In some implementations, the CGR content generator 512 modifies and/or generates the modified CGR content 514 content based at least in part on the CGR content 508 (e.g., reference CGR content that is selected by the CGR content modifier 510 or currently being presented to the user 150) and the user model 460. In some implementations, the CGR content manager 506 presents the modified CGR content 514 to the user 150 via the display 122 on the electronic device 124.

In some implementations, after presenting the modified CGR content 514 to the user 150, the data processing architecture 500 obtains sensor information associated with the user 150; determines, using the qualitative mood classifier 220, a resultant state 507 of the user 150 based on the sensor information associated with the user; and updates the user model 460 based at least in part on the resultant state 507 of the user 150 and the modified CGR content 514. To that end, the qualitative mood classifier 220 includes a trained neural network 516 that determines the resultant state 507 of the user 150 while the electronic device 124 presents the modified CGR content 514 to the user 150. In some implementations, the trained neural network 516 enables the data processing architecture 500 to determine whether the CGR content manager 506 is successful in invoking the target state 502 of the user 150 by presenting the modified CGR content 514 to the user 150. The CGR content manager 506 is successful when the trained neural network 516 determines that the resultant state 507 of the user 150 matches the target state 502 of the user 150. In some implementations, the electronic device 124 updates the user model 460 with the resultant state 507 of the user 150 and the modified CGR content 514 in order to correlate the modified CGR content 514 to projected reactions of the user 150. The features and components of the user model 460 is described below in greater detail above with respect to FIG. 7.

Although the CGR content manager 506, the CGR content modifier 510, the CGR content generator 512, the qualitative mood classifier 220, the trained neural network 516, and the user model 460 are shown as residing on a single device (e.g., the data processing architecture 500), it should be understood that in other implementations, any combination of the CGR content manager 506, the CGR content modifier 510, the CGR content generator 512, the qualitative mood classifier 220, the trained neural network 516, and the user model 460 may be located in separate computing devices.

Moreover, FIG. 5 is intended more as functional description of the various features which may be present in a particular implementation as opposed to a structural schematic of the implementations described herein. As recognized by those of ordinary skill in the art, items shown separately could be combined and some items could be separated. For example, some functional modules shown separately in FIG. 5 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 6:
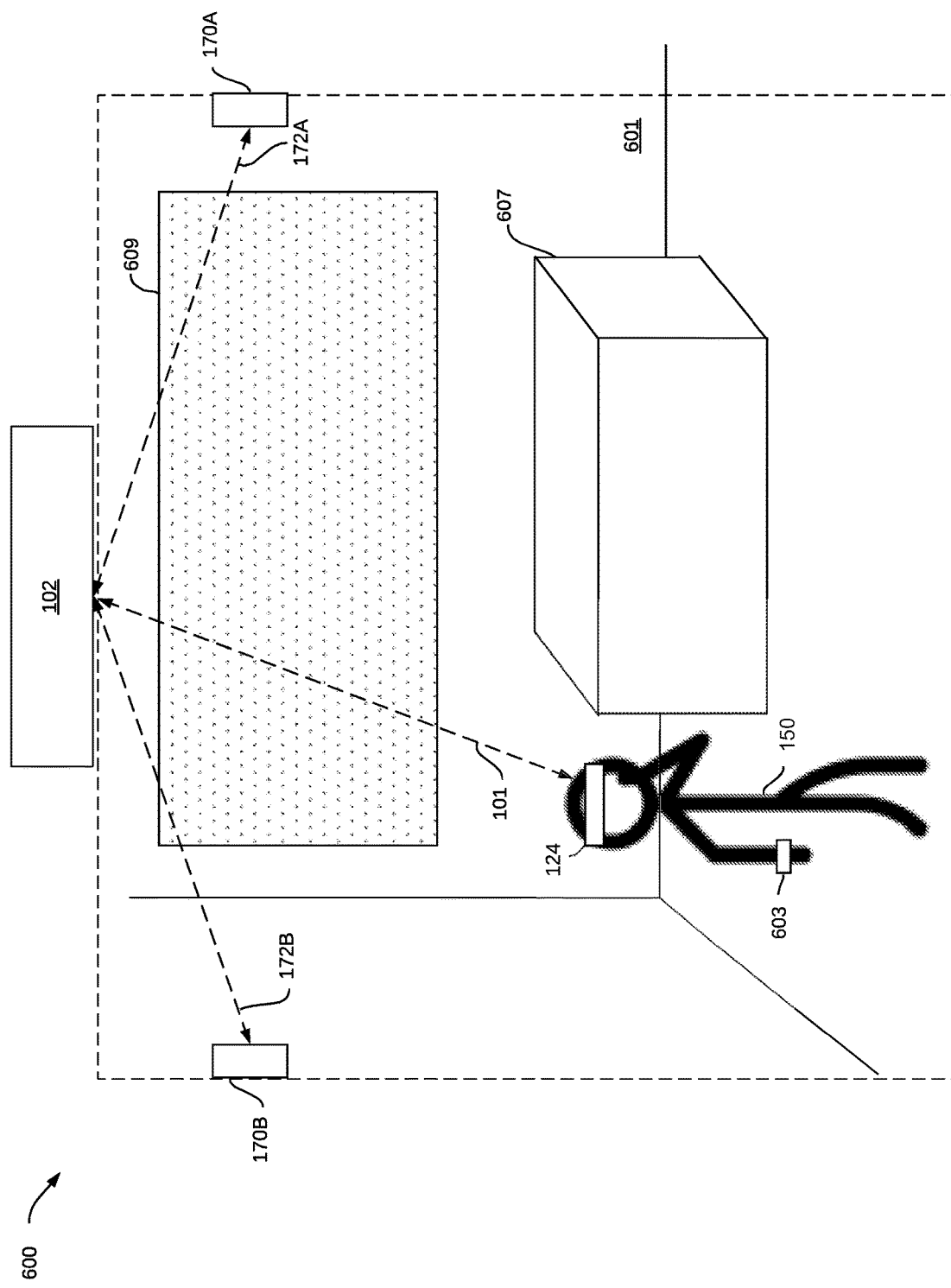
FIG. 6 is a block diagram of an example operating architecture in accordance with some implementations.

FIG. 6 is a block diagram of an example operating architecture 600 in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations, the example operating architecture 600 includes a physical environment 601 including the controller 102, the user 150, the electronic device 124 worn by the user 150, a wearable electronic device 603 worn by the user 150, a sofa 607, CGR content 609, and one or more optional remote input devices 170A and 170B within the physical environment 601. While the example operating architecture 100 in FIG. 1 does not include the remote input devices 170A and 170B, those of ordinary skill in the art will appreciate from the present disclosure that the operating environment of various implementations of present invention may include any number of remote input devices, such as a single remote input device.

In the example operating architecture 600, the user 150 wears the electronic device 124 on his/her head. As such, the electronic device 124 includes one or more displays provided to display the CGR content 609 (e.g., one display for each eye of the user 150). In some implementations, the electronic device 124 is replaced with a CGR chamber, enclosure, or room configured to present CGR content in which the user 150 does not wear the electronic device 124. In some implementations, the electronic device 124, the controller 102, and/or the remote input devices 170A and 170B are configured to obtain eye tracking data 402D. In some implementations, the remote input devices 170A and 170B deliver the eye tracking data 402D to the controller 102 via the wired or wireless communication channels 172A and 172B (e.g., BLUETOOTH, IEEE 802.11x, IEEE 802.16x, IEEE 802.3x, etc.). In some implementations, the controller 102 is communicatively coupled with the electronic device 124 via one or more wired or wireless communication channels 144 (e.g., BLUETOOTH, IEEE 802.11x, IEEE 802.16x, IEEE 802.3x, etc.).

In the example operating architecture 600, the user 150 also wears the wearable electronic device 603 on his/her wrist or body, which is communicatively coupled with at least the electronic device 124. In some implementations, the wearable electronic device 603 includes one or more sensors configured to obtain audio data 402A, physiological measurements 402B, body pose data 402C, and/or eye tracking data 402D of the user 150. In some implementations, the physical environment 601 includes the controller 102, the electronic device 124, and/or the remote input devices 170A and 170B configured to obtain audio data 402A, physiological measurements 402B, body pose data 402C, and/or eye tracking data 402D of the user 150. In some implementations, the remote input devices 170A and 170B deliver the audio data 402A, physiological measurements 402B, body pose data 402C, and/or eye tracking data 402D of the user 150 to the controller 102 via the wired or wireless communication channels 172A and 172B (e.g., BLUETOOTH, IEEE 802.11x, IEEE 802.16x, IEEE 802.3x, etc.). In some implementations, the controller 102 is communicatively coupled with the electronic device 124 via one or more wired or wireless communication channels 144 (e.g., BLUETOOTH, IEEE 802.11x, IEEE 802.16x, IEEE 802.3x, etc.). In some implementations, the functionalities of the wearable electronic device 603 are provided by and/or combined with the electronic device 124.

Figure 7:
FIG. 7 illustrates an example user model associated with a user in accordance with some implementations.

FIG. 7 illustrates an example user model 700 associated with a user in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein.

In some implementations, the user model 700 is configured to provide projected reactions (e.g., the resultant state 304 shown in FIG. 3 or the resultant state 507 shown in FIG. 5) to the modified CGR content (e.g., the modified CGR content 514 shown in FIG. 5) by tracking how the modified CGR content affects the state of the user 150. In other words, the user model 700 includes historical information including past user state data such as measured state, target state, resultant state, and modified CGR content when viewing particular CGR content in order to correlate the modified CGR content to the projected reactions of the user 150. In some implementations, the past user state data may be derived from a wearable device (e.g., the wearable electronic device 603 shown in FIG. 6), eye tracking information, phone, tablet, health kit, or the like. For example, if the past user state data corresponding to sensor information associated with a user indicates that the resultant state of the user is scared when the electronic device 124 presents CGR content that includes spiders, then the electronic device 124 can presume that, in the future, the resultant state of the user will also be scared when the electronic device 124 presents spiders to the user 150. In some implementations, the electronic device 124 and/or the controller 102 generates the user model 700 based at least in part on a first resultant reaction by the user 150 to first modified CGR content and a second resultant reaction by the user to second modified CGR content.

In some implementations, the user model 700 includes crowd-sourced information that contains information about past user state data from other users such as measured state, target state, resultant state, and modified CGR content. For example, the crowd-sourced information may come from a central database that characterizes common past user state data when viewing particular CGR content in order to help form a basis or starting point for the user model 700. For example, the past user state data may include common reactions for a majority of users such as a resultant state of scared when the electronic device 124 presents CGR content that is intended to scare users such as spiders. As another example the past user state data may include other common reactions for the majority of users such as a resultant state of happiness when the electronic device 124 presents CGR content that is intended to make the user happy such as a puppy.

In some implementations, the user model 700 illustrates different entries that include a measured state, target state, CGR content, and resultant state for the user 150. Those of ordinary skill in the art will appreciate that the user model 700 includes merely the basic information typically available for the target state requested by the user 150 and the associated modified CGR content (e.g., the CGR content presented to the user 150). So, while some specific features are illustrated, those of ordinary skill in the art will appreciate from the present disclosure that various features have not been illustrated for the sake of brevity and so as not to obscure the more pertinent aspects of the user model 700.

As a first example, the electronic device 124 and/or the controller 102 presents a virtual agent with a neural expression to the user via the one or more displays. Next, the electronic device 124 and/or the controller 102 determines the current measured state of the user to be calm and obtains a request from the user 150 to obtain a target state of happiness. In some implementations, the electronic device 124 and/or the controller 102 determines what CGR content to generate in order to invoke the target state of happiness by matching the target state and/or the current measured state to a pre-existing entry from the user model 700. In some implementations, the electronic device 124 and/or the controller 102 tries to find a pre-existing entry where the target state matches the resultant state and the CGR content from the pre-existing entry is closely related to the CGR content that is currently presented by the electronic device 124 when the user requests to invoke the target state.

Continuing with the first example, assuming that the electronic device 124 and/or the controller 102 is displaying the virtual agent with a neutral expression to the user 150 and the current measured state of the user is calm, if the electronic device 124 and/or the controller 102 obtains a request to invoke a target state of happiness for the user 150, then the electronic device 124 and/or the controller 102 searches the user model 700 for a pre-existing entry that includes the measured state of calm, resultant state of happiness, and CGR content related to the currently presented CGR content of the virtual agent. As shown in FIG. 7, the first entry 701 is a pre-existing entry that contains a measured state of calm, the resultant state of happy, and the CGR content is a virtual agent with a happy expression. Accordingly, in this example, the first entry 701 includes a measured state of calm that matches the current measured state of calm, the target state of happiness matches the resultant state of happiness, and the CGR content is a virtual agent with a happy expression that is closely related to the virtual agent with the neutral expression. As such, the electronic device 124 and/or the controller 102 generates the virtual agent with the happy expression to invoke a target state of happiness for the user 150 based on the first entry 701.

Continuing with the first example, after the electronic device 124 presents the virtual agent with the happy expression to the user 150, the electronic device 124 and/or the controller 102 obtains sensor information associated with the user 150 in order to determine the resultant state for the user 150. In some implementations, the sensor information corresponds to one or more physiological measurements of the user. In some implementations, the electronic device 124 and/or the controller 102 determines, using the trained neural network (e.g., the trained neural network 516 shown in FIG. 5), the resultant state of the user 150 while the electronic device 124 and/or the controller 102 presents the virtual agent with the happy expression to the user 150. Here, the electronic device 124 and/or the controller determines that the resultant state of the user is happy. As such, the electronic device 124 and/or the controller 102 is successful in invoking the target state of happiness for the user 150 by presenting the virtual agent with a happy expression to the user 150. In some implementations, after the electronic device 124 and/or the controller 102 displays the virtual agent with the happy expression to the user 150, the electronic device 124 and/or the controller 102 increments the count in the first entry 701 in order to increase the level of confidence of using the first entry 701 for subsequent operations.

As a second example, the electronic device 124 and/or the controller 102 presents a tiger to the user via the one or more displays. Next, the electronic device 124 and/or the controller 102 determines the current measured state of the user to be calm and obtains a request from the user 150 to obtain a target state of happiness. In some implementations, the electronic device 124 and/or the controller 102 determines what CGR content to generate in order to invoke the target state of happiness by matching the current measured state and target state to a pre-existing entry in the user model 700. In some implementations, the electronic device 124 and/or the controller 102 tries to find a pre-existing entry where the target state matches the resultant state and the CGR content from the pre-existing entry is closely related to the CGR content that is currently presented by the electronic device 124 when the user requests to invoke the target state.

Continuing with the second example, assuming that the electronic device 124 and/or the controller 102 is displaying the tiger to the user 150 and the current measured state of the user is calm, if the electronic device 124 and/or the controller 102 obtains a request to invoke a target state of happiness for the user 150, then the electronic device 124 and/or the controller 102 searches the user model 700 for a pre-existing entry includes the measured state of calm, resultant state of happiness, and CGR content closely related to the currently presented CGR content of the tiger. As shown in FIG. 7, the closest pre-existing entry is a second entry 703 that contains the measured state of calm, the resultant state of happy, and the CGR content is a cat—which is the closet CGR content to a tiger in the user model 700. However, as mentioned above, in some implementations, the electronic device 124 and/or the controller populates some entries (e.g., the second entry 703) from crowd-sourced information and the user 150 is allergic to cats and, thus, the user 150 becomes agitated when the user 150 sees cats.

Continuing with the second example, after the electronic device 124 presents the cat to the user 150, the electronic device 124 and/or the controller 102 obtains sensor information associated with the user 150 in order to determine the resultant state of the user 150. In some implementations, the electronic device 124 and/or the controller 102 determines, using the qualitative mood classifier, the resultant state of the user 150 while the electronic device 124 and/or the controller 102 presents the cat to the user 150. Here, the electronic device 124 and/or the controller 102 determines that the resultant state of the user 150 is agitation. As such, the electronic device 124 and/or the controller 102 is not successful in invoking the target state of happiness for the user 150 by presenting the cat to the user 150 because the user 150 is allergic to cats. In some implementations, after the electronic device 124 and/or the controller 102 displays the cat to the user 150, the electronic device 124 and/or the controller 102 decrements the count in the second entry 703 in order to decrease the level of confidence of using the second entry 703 for subsequent operations. In some implementations, after the electronic device 124 and/or the controller 102 displays the cat to the user 150, the electronic device 124 and/or the controller 102, the electronic device 124 and/or the controller 102 adds a new entry with the measured state of calm, target state of happy, CGR content of cat, and resultant state of agitation to the user model 700. As such, the electronic device 124 no longer presents a cat to the user 150 when the user 150 requests a target state 502 of happiness and, may instead, presents cats to the user 150 when the user 150 requests a target state 502 of being agitated based on the new entry.

Figure 8A:
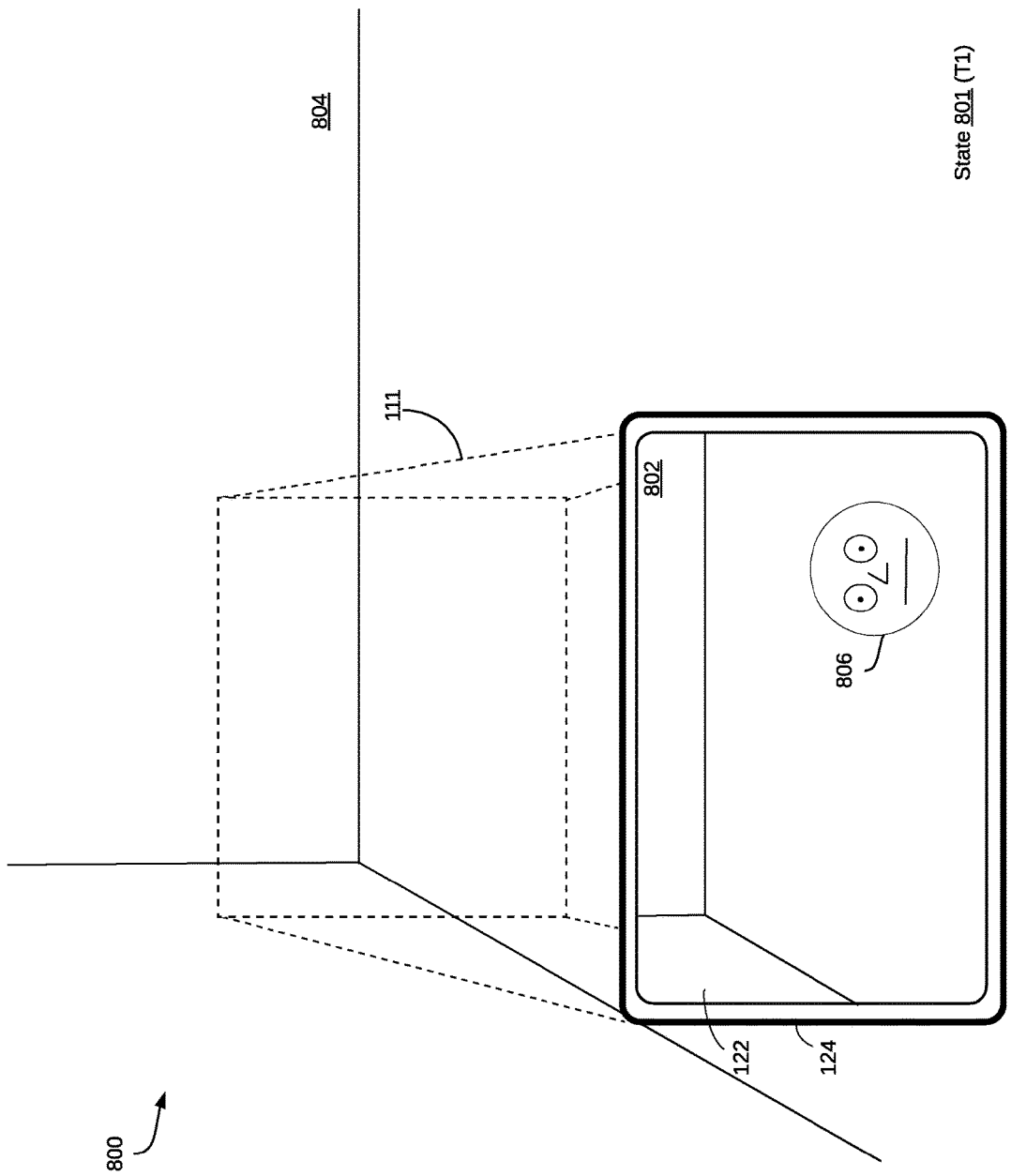
Figure 8C:
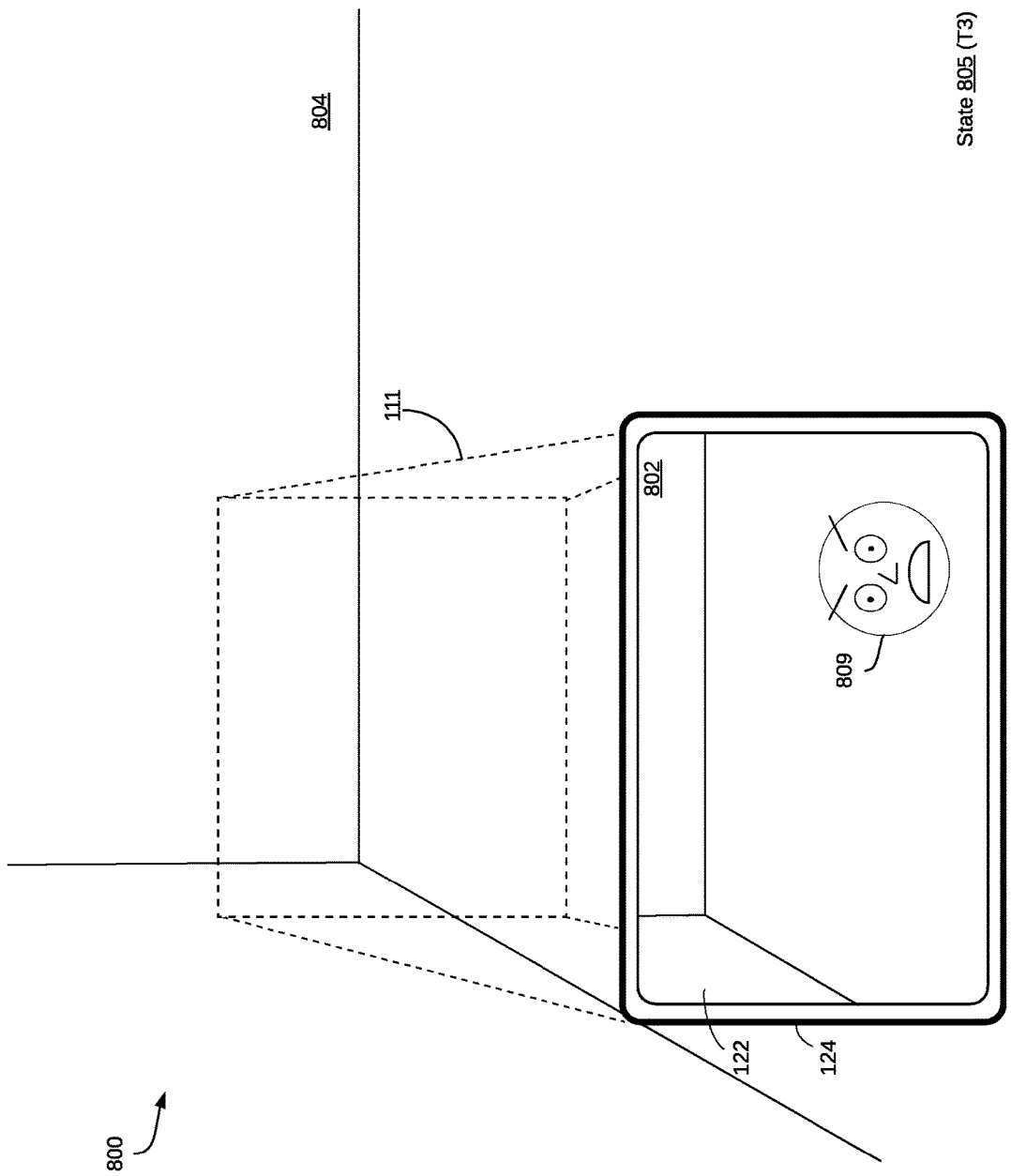

FIGS. 8A-8C illustrate an example CGR presentation scenario 800 for generating and presenting CGR content to invoke a target state of a user in accordance with some implementations. While pertinent features are shown, those of ordinary skill in art will appreciate from the present disclosure that various other features have not been illustrated for the sake of brevity and so as not to obscure more pertinent aspects of the example implementations disclosed herein.

FIG. 8A illustrates a first state 801 (e.g., associated with T1 or a first time period) of the example CGR presentation scenario 800. In the first state 801, at least a portion of the physical environment 804 is within the field-of-view 111 of an external-facing image sensor of the electronic device 124. As shown in FIG. 8A, the physical environment 804 includes an empty room. In some implementations, where the field-of-view 111 of the user 150 is enclosed, the electronic device 124 is configured to enable video pass-through of the physical environment 804 including the empty room on the display 122 and to present the user interface 802 on the display 122. In some implementations, the display 122 corresponds to an additive display that enables optical-see through of the physical environment 804 including the empty room. For example, the display 122 corresponds to a transparent lens, and the electronic device 124 corresponds to a pair of glasses worn by the user 150. In some implementations, the electronic device 124 presents the user interface 802 by projecting the modified CGR content onto the additive display, which is, in turn overlaid on the physical environment 804 from the perspective of the user 150. In some implementations, the electronic device 124 presents the user interface 802 by rendering the modified CGR content on the additive display, which is also, in turn overlaid on the physical environment 804 from the perspective of the user 150.

As shown in FIG. 8A, the electronic device 124 and/or controller 102 presents, via the display 122, the user interface 802 that includes a virtual agent with a neutral expression 806. In this example, the virtual agent with the neutral expression 806 is the reference CGR content. In some implementations, while presenting the virtual agent with the neutral expression 806, the electronic device 124 and/or the controller 102 obtains a request from the user 150 to invoke a target state for the user 150. In some implementations, after presenting the virtual agent with the neutral expression 806 to the user 150, the electronic device 124 and/or the controller 102 obtains sensor information associated with the user 150. In some implementations, the sensor information is at least one of audio data 402A, physiological measurements 402B, body pose data 402C, and eye tracking data 402D.

In some implementations, the electronic device 124 and/or the controller 102 determines, using the qualitative mood classifier (e.g., the qualitative mood classifier 220 shown in FIGS. 4 and 5) and the sensor information associated with the user, that the resultant state of the user is calm. As an example, provided for reference and to illustrate attributes and values associated with a particular modified CGR content, the user state information for the virtual agent with the neutral expression 806 includes parameters such as resultant state of calm, CGR content of the virtual agent with a neutral expression 806 and sensor information data associated with the user 150 such as physiological measurements 402B including heart rate of 80 BPM, pupil dilation diameter of 3.0 mm, and body pose data 402C indicating that the user 150 is sitting.

FIG. 8B illustrates a second state 803 (e.g., associated with T2 or a second time period) of the example CGR presentation scenario 800. In FIG. 8B, the electronic device 124 and/or the controller 102 modifies the CGR content such that the virtual agent with the neutral expression 806 is modified to a virtual agent with a happy expression 807 based at least in part on searching for a pre-existing entry in the user model (e.g., the user model 700 shown in FIG. 7) where the target state matches the resultant state and the CGR content from the pre-existing entry is closely related to the virtual agent with the neutral expression. With reference to FIG. 7, the first entry 701 in the user model 700 includes a measured state of calm, a resultant state of happiness, and CGR content of the virtual agent with a happy facial expression 807. To that end, the electronic device 124 and/or the controller 102 presents the virtual agent with the happy expression 807 based at least in part on information from the first entry 701 from the user model 700 in an attempt to invoke the target state 502 of happiness for the user 150.

As shown in FIG. 8B, at time T2, the electronic device 124 presents, via the display 122, the user interface 802 including the modified virtual agent with the happy expression 807 to the user 150. In some implementations, after presenting the modified virtual agent with the happy expression 807 to the user 150, the electronic device 124 and/or the controller 102 obtains sensor information associated with the user 150. In some implementations, the sensor information is at least one of audio data 402A, physiological measurements 402B, body pose data 402C, and eye tracking data 402D. In some implementations, the electronic device 124 and/or the controller 102 determines, using the qualitative mood classifier (e.g., the qualitative mood classifier 220 shown in FIGS. 4 and 5) and the sensor information associated with the user, that the resultant state of the user is happiness. The features and components of the qualitative mood classifier is described in greater detail above with respect to FIG. 4A. As such, the electronic device 124 and/or the controller 102 is successful in invoking the target state of happiness by presenting a virtual agent with the happy expression 807 to the user 150.

As an example, provided for reference and to illustrate attributes and values associated with a particular modified CGR content, the user state information for the virtual agent with the happy expression 807 includes parameters such as the measured state of calm, the target state of happy, the resultant state of happy, CGR content of virtual agent with happy expression 807 and sensor information data associated with the user 150 such as physiological measurements 402B including heart rate of 90 BPM, pupil dilation diameter of 3.0 mm, and body pose data 402C indicating the user 150 with his/her arms down. In some implementations, the electronic device 124 and/or the controller 102 updates the user model based at least in part on the resultant state of happy for the user and the CGR content of the modified virtual agent with the happy expression 807 by incrementing the count in the first entry 701 in the user model 700 in order to increase the level confidence of using the first entry 701 in subsequent operations.

FIG. 8C illustrates a third state 805 (e.g., associated with T3 or a third time period) of the example CGR presentation scenario 800. In comparison to FIG. 8B, the reference CGR content is the virtual agent with the happy expression 807 and the electronic device 124 and/or the controller 102 obtains a request from the user 150 to invoke a target state of scared. In some implementations, the electronic device 124 and/or the controller 102 modifies the virtual agent with the happy expression 807 to a virtual agent with a frowning expression 809 based at least in part on searching for a pre-existing entry in the user model where a target state matches the resultant state and CGR content from the pre-existing entry is closely related to the virtual agent with the happy expression. With reference to FIG. 7, the third entry 705 in the user model 700 indicates a measured state of happy, a resultant state of scared, and CGR content of the virtual agent with a frowning expression. To that end, the electronic device 124 and/or the controller 102 presents the virtual agent with the frowning expression 809 based at least in part on information from the third entry 705 from the user model 700 in an attempt to invoke the target state of scared for the user 150.

As shown in FIG. 8C, at time T3, the electronic device 124 presents, via the display 122, the user interface 802 including the modified virtual agent with the frowning expression 809 to the user 150. In some implementations, after presenting the modified virtual agent with the frowning expression 809 to the user 150, the electronic device 124 and/or the controller 102 obtains sensor information associated with the user 150. In some implementations, the electronic device 124 and/or the controller 102 determines, using the qualitative mood classifier and the sensor information associated with the user, that the resultant state of the user is scared. As such, the electronic device 124 and/or the controller 102 is successful in invoking the target state of being scared for the user 150 by presenting the virtual agent with frowning expression 809 to the user 150.

With reference to FIG. 8C, the user state information for the virtual agent with the frowning expression 809 includes parameters such as the measured state of happy, the target state of scared, the resultant state of scared, the CGR content of virtual agent with frowning expression 809 and the sensor information data associated with the user 150 such as physiological measurements 402B including a heart rate of 120 BPM, pupil dilation diameter of 8.0 mm, and audio data 402A indicating a speech characteristic associated with a stuttering speech pattern. In some implementations, the electronic device 124 and/or the controller 102 updates the user model based at least in part on the resultant state of scared for the user and the modified virtual agent with the frowning expression 809 by incrementing the count in the third entry 705 in the user model 700 in order to increase the level of confidence in using the third entry 705 in subsequent operations.

FIGS. 9A-9D illustrate another example CGR presentation scenario 900 for generating and presenting CGR content to invoke a target state of a user in accordance with some implementations. While pertinent features are shown, those of ordinary skill in art will appreciate from the present disclosure that various other features have not been illustrated for the sake of brevity and so as not to obscure more pertinent aspects of the example implementations disclosed herein.

Figure 9A:
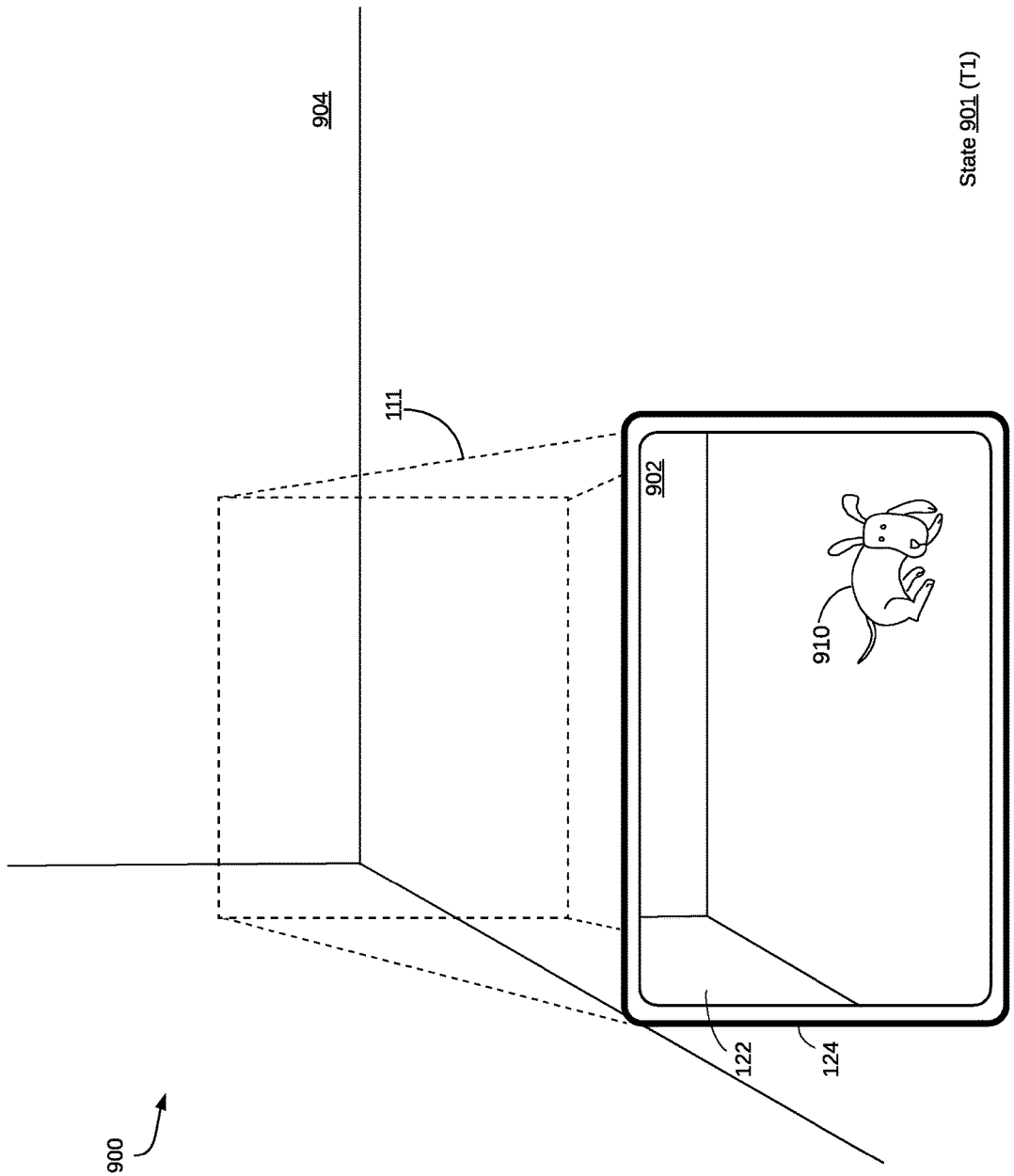
FIGS. 9A-9D illustrate another example CGR presentation scenario for generating and presenting CGR content to invoke a target state of a user in accordance with some implementations.

FIG. 9A illustrates a first state 901 (e.g., associated with T1 or a first time period) of an example CGR presentation scenario 900. In the first state 901, at least a portion of the physical environment 904 is within a field-of-view 111 of an external-facing image sensor of the electronic device 124. As shown in FIG. 9A, the physical environment 904 includes an empty room. In some implementations, where the field-of-view 111 of a user is enclosed, the electronic device 124 is configured to enable video pass-through of the physical environment 904 including the empty room on the display 122 and to present a user interface 902 on the display 122. In some implementations, the display 122 corresponds to an additive display that enables optical-see through of the physical environment 904 including the empty room. For example, the display 122 corresponds to a transparent lens, and the electronic device 124 corresponds to a pair of glasses worn by the user 150. In some implementations, the electronic device 124 presents the user interface 902 by projecting the modified CGR content onto the additive display, which is, in turn overlaid on the physical environment 904 from the perspective of the user 150. In some implementations, the electronic device 124 presents the user interface 902 by rendering the modified CGR content on the additive display, which is also, in turn overlaid on the physical environment 904 from the perspective of the user 150.

With reference to FIG. 9A, at some time before T1, the electronic device 124 and/or the controller 102 obtains a request from the user 150 to invoke a target state of calm for the user 150. In some implementations, the electronic device 124 and/or the controller 102 searches for pre-existing entries from the user model (e.g., the user model 700 shown in FIG. 7) where the target state matches the resultant state and the CGR content from the pre-existing entry is closely related to the CGR content that is currently presented by the electronic device 124 when the user requests to invoke the target state. With reference to FIG. 7, the fourth entry 707 in the user model 700 includes a measured state of scared, a resultant state of calm, and CGR content of a dog laying down. In this example, although the current measured state for the user is happy and the fourth entry 707 indicates a measured state of scared, it is more important that the target state of calm matches the resultant state of calm because the measured state of scared is not a pre-condition for invoking the resultant state in some implementations. For example, even if the current measured state of the fourth entry 707 is scared, the fourth entry 707 indicates that the resultant state of the user may be calm when the electronic device 124 and/or the controller 102 presents the dog 910 laying down to the user 150. To that end, the electronic device 124 and/or the controller 102 presents the dog 910 laying down based at least in part on information from the fourth entry 707 from the user model 700 in an attempt to invoke the target state of calm for the user 150. As shown in FIG. 9A, the electronic device 124 and/or the controller 102 generates a dog 910 laying down based at least in part on the fourth entry 707 from the user model (e.g., the user model 700 shown in FIG. 7) in an attempt to invoke the target state 502 of calm for the user 150.

As shown in FIG. 9A, at time T1, the electronic device 124 presents, via the display 122, the user interface 902 including the dog 910 laying down to the user 150. In some implementations, after presenting the dog 910 laying down, the electronic device 124 and/or the controller 102 obtains sensor information associated with the user 150. In some implementations, the sensor information is at least one of audio data 402A, physiological measurements 402B, body pose data 402C, and eye tracking data 402D. In some implementations, the electronic device 124 and/or the controller 102 determines, using the qualitative mood classifier (e.g., the qualitative mood classifier 220 shown in FIGS. 2, 4, and 5) and the sensor information associated with the user, that the resultant state of a user is calm. As such, the electronic device 124 and/or the controller 102 is successful in invoking the target state 502 of calm by displaying, via the display 122, the user interface 902 including the dog 910 laying down to the user 150.

With reference to FIG. 9A, the user state information for the dog 910 laying down includes parameters such as the measured state of happy, the target state of calm, the resultant state of calm, CGR content of the dog 910 laying down and sensor information data such as audio data 402A including a transcript of the speech of "Wow, I am relaxed", physiological measurements 402B including a heart rate of 80 BPM and pupil dilation diameter of 3.0 mm, and body pose data 402C of the user 150 sitting. In some implementations, the electronic device 124 and/or the controller 102 updates the user model (e.g., the user model 700 shown in FIG. 7) based at least in part on the resultant state of the user of calm and the dog 910 laying down by incrementing the count in the fourth entry 707 in the user model 700 in order to increase the level of confidence of using the fourth entry 707 in subsequent operations.

Figure 9B:
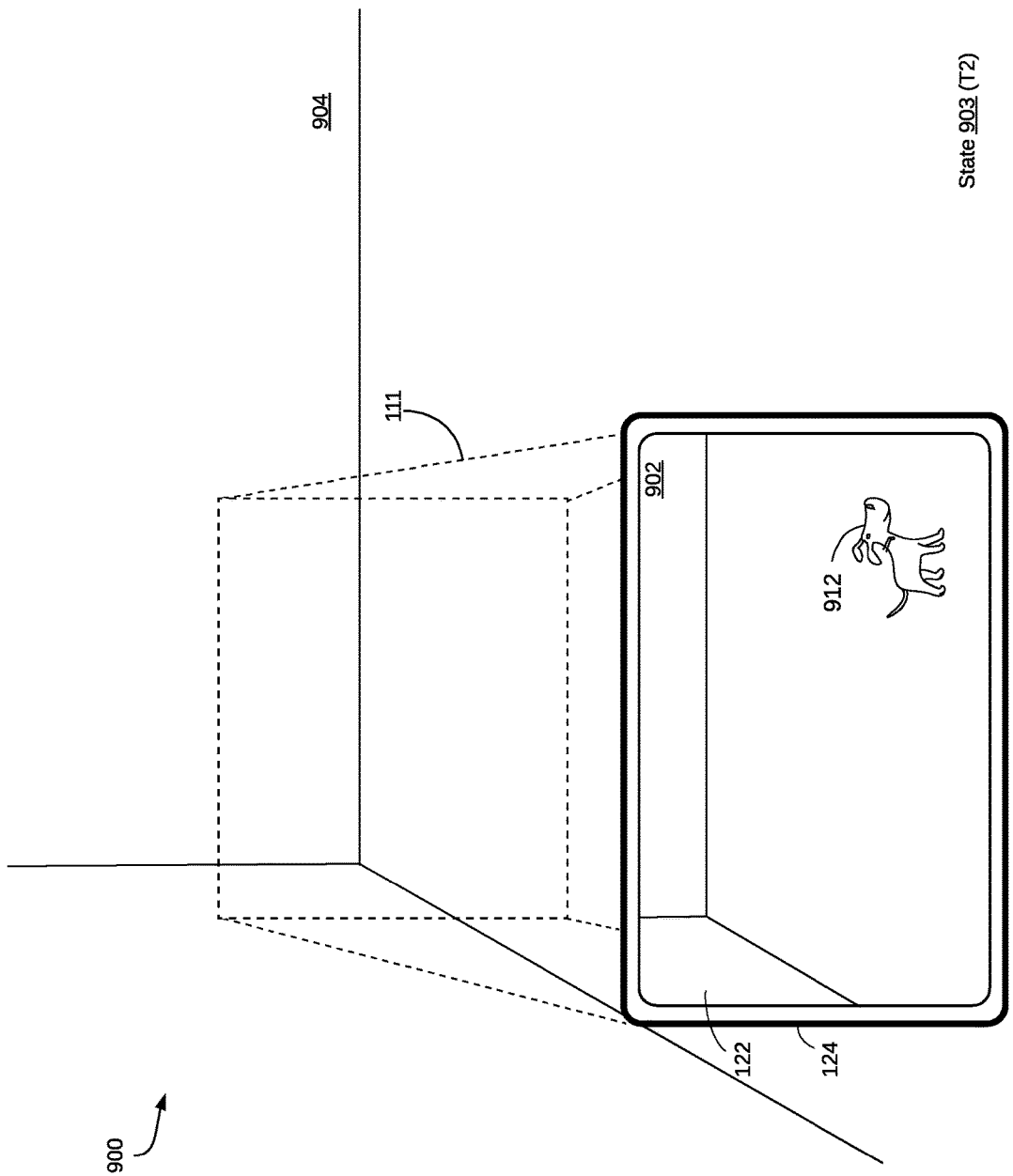

FIG. 9B illustrates a second state 903 (e.g., associated with T2 or a second time period) of the example CGR presentation scenario 900. The electronic device 124 and/or the controller 102 modifies the CGR content such that the dog 910 laying down shown in FIG. 9A is modified to a dog 912 standing in FIG. 9B based on searching for a pre-existing entry in the user model (e.g., the user model 700 shown in FIG. 7) where the target state matches the resultant state, and the CGR content is closely related to the CGR content of the dog 910 laying down. With reference to FIG. 7, the fifth entry 709 from the user model includes a resultant state of alertness and a CGR content of a dog standing that is closely related to the CGR content of the dog 910 laying down. To that end, the electronic device 124 and/or the controller 102 presents the dog 912 standing based at least in part on information from the fifth entry 709 from the user model 700. As such, the electronic device 124 and/or the controller 102 modifies the dog 910 laying down to a dog 912 standing based at least in part on the fifth entry 709 from the user model in an attempt to invoke the target state of alertness for the user 150.

As shown in FIG. 9B, at time T2, the electronic device 124 presents, via the display 122, the user interface 902 including the dog 912 standing to the user 150. In some implementations, after presenting the dog 912 standing to the user 150, the electronic device 124 and/or the controller 102 obtains sensor information associated with the user 150. In some implementations, the electronic device 124 and/or the controller 102 determines, using the qualitative mood classifier and the sensor information associated with the user, that the resultant state for the user is alertness. As such, the electronic device 124 and/or the controller 102 is successful in invoking the target state 502 of alertness by presenting the dog 912 standing to the user 150.

With reference to FIG. 9B, the user state information for the dog 912 standing includes parameters such as the measured state of calm, the target state of alert, the resultant state of alert, CGR content of the dog 912 standing and sensor information data such as audio data 402A including speech characteristics of normal-paced speech cadence, physiological measurements 402B including a heart rate of 100 BPM and pupil dilation diameter of 4.5 mm, body pose data 402C of the user 150 standing, and eye tracking data 402D of the gaze of the user focused on the dog 912 standing. In some implementations, the electronic device 124 and/or the controller 102 updates the user model based at least in part on the resultant state of calm for the user and the CGR content of the dog 912 standing by updating the count in the fifth entry 709 in the user model 700 in order to increase the level of confidence of using the fifth entry 709 in subsequent operations.

Figure 9C:
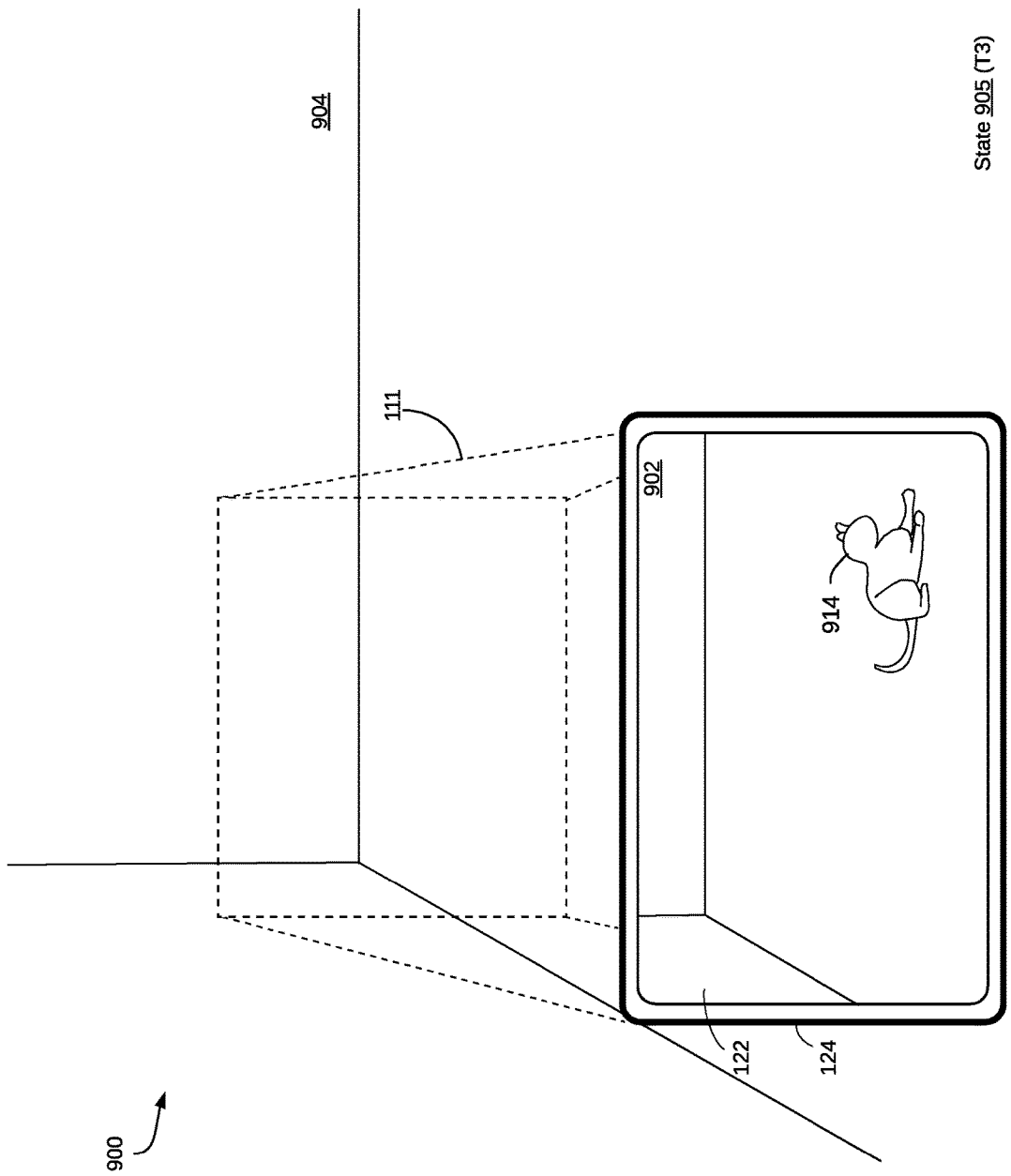

FIG. 9C illustrates a third state 905 (e.g., associated with T3 or a third time period) of the example CGR presentation scenario 900 The electronic device 124 and/or the controller 102 modifies the CGR content such that the dog 912 standing shown in FIG. 9B is modified to a cat 914 laying down in FIG. 9C based on searching for pre-existing entries in the user model where the target state matches the resultant state, and CGR content is related to the dog 912 standing. With reference to FIG. 7, the closest pre-existing entry is a sixth entry 711 in the user model that includes a measured state of alertness, a target state of calm, and CGR content of a cat. To that end, the electronic device 124 and/or the controller modifies the dog 912 standing to a cat 914 laying down based at least in part on the sixth entry 711 in the user model in an attempt to invoke the target state of calmness to the user 150.

As shown in FIG. 9C, at time T3, the electronic device 124 presents, via the display 122, the user interface 902 including the cat 914 laying down to the user 150. However, in this example, the user 150 is allergic to cats. Thus, presenting a cat 914 laying down to the user 150 will not invoke the target state of calmness for the user 150. Here, the electronic device 124 and/or the controller 102 determines, using the qualitative mood classifier and the sensor information associated with the user, that the resultant state of the user 150 is agitation. As such, the electronic device 124 and/or the controller 102 is not successful in invoking the target state of calmness by presenting the user interface 902 including the cat 914 laying down to the user 150.

With reference to FIG. 9C, the user state information for the cat 914 laying down includes parameters such as the measured state of alert, target state of calm, resultant state of agitation, and CGR content of the cat 914 laying down and sensor information data associated with the user 150 such as audio data 402A including a speech transcript of "Yuck", physiological measurements 402B including a heart rate of 120 BPM and pupil dilation diameter of 7.0 mm, body pose data 402C indicating that the user 150 is standing, and eye tracking data 402D indicating eyes darting. In some implementations, the electronic device 124 and/or the controller 102 updates the user model by decrementing the count in the sixth entry 711 in the user model 700 in order to decrease the level of confidence of using the sixth entry 711 in subsequent operations. In some implementations, the electronic device 124 and/or the controller 102 updates the user model by adding a new entry to the user model 700 with the measured state of alertness, target state of calm, resultant state of agitation, and CGR content of the cat 914 laying down in order to apply information in the new entry to subsequent operations.

Figure 9D:
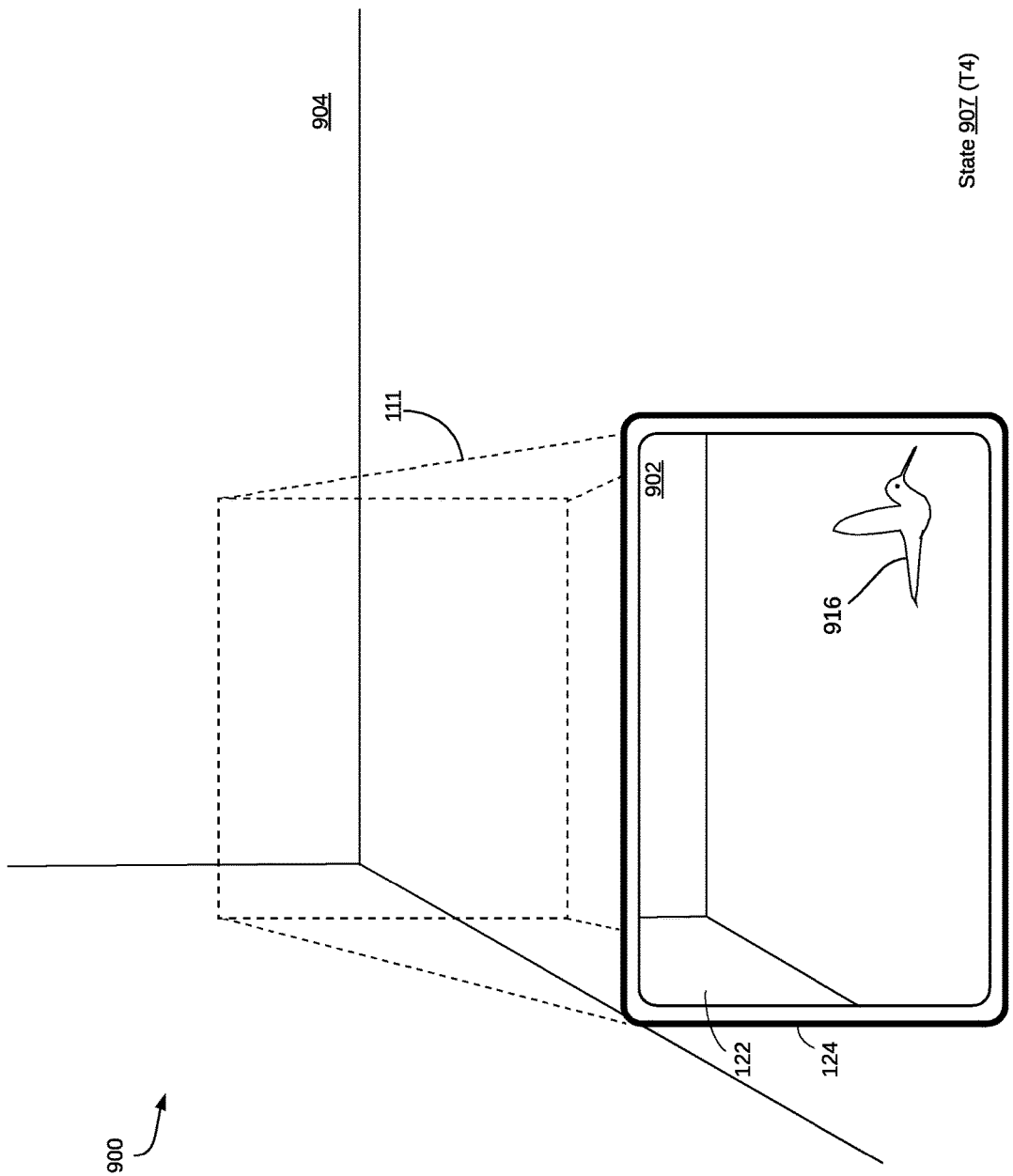

FIG. 9D illustrates a fourth state 907 (e.g., associated with T4 or a fourth time period) of the example CGR presentation scenario 900. The electronic device 124 and/or the controller 102 modifies the CGR content such that the cat 914 laying down shown in FIG. 9C is modified to a hummingbird 916 in FIG. 9D based on searching for a pre-existing entry in the user model where the measured state matches the resultant state, the target state matches the resultant state, and the CGR content is closely related to the cat 914 laying down. With reference to FIG. 7, the closest pre-existing entry is the seventh entry 713 in the user model 700 that includes a measured state of agitation, a resultant state of relaxation, and CGR content of a hummingbird 916. To that end, the electronic device 124 and/or the controller 102 modifies the cat 914 laying down to a hummingbird 916 based at least in part on the seventh entry 713 from the user model in an attempt to invoke the target state of relaxation for the user 150.

As shown in FIG. 9D, at time T4, the electronic device 124 presents, via the display 122, the user interface 902 including the hummingbird 916 to the user 150. In some implementations, after presenting the hummingbird 916 to the user 150, the electronic device 124 and/or the controller 102 obtains sensor information associated with the user 150. Here, the electronic device 124 and/or the controller 102 determines, using the qualitative mood classifier and the sensor information associated with the user, that the resultant state of the user is relaxation. As such, the electronic device 124 and/or the controller 102 is successful in invoking the target state of relaxation by presenting a hummingbird 916 to the user 150.

With reference to FIG. 9D, the user state information for the hummingbird 916 includes parameters such as the measured state of agitation, the target state of relaxation, resultant state of relaxation, and CGR content of the hummingbird 916 and sensor information data associated with the user 150 such as audio data 402A indicating a slow speech cadence, physiological measurements 402B including a heart rate of 90 BPM and pupil dilation diameter of 3 mm, and body pose data 402C indicating that the user 150 is laying down. In some implementations, the electronic device 124 and/or the controller 102 updates the user model based at least in part on the resultant state of relaxation for the user and the CGR content of the hummingbird 916 by incrementing the count in the seventh entry 713 in the user model 700 in order to increase the level of confidence of applying the seventh entry 713 in subsequent operations.

Figure 10:
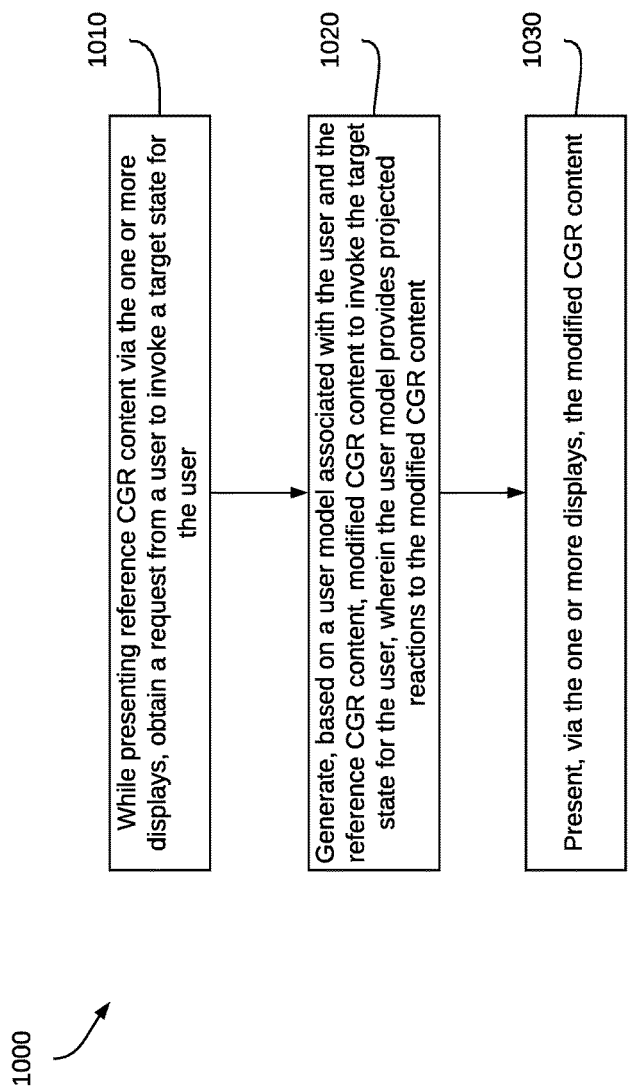
FIG. 10 is a flowchart representation of a method of generating and presenting CGR content to invoke a target state of a user in accordance with some implementations.

FIG. 10 is a flowchart representation of a method of generating and presenting CGR content to invoke a target state of a user in accordance with some implementations. In various implementations, the method 1000 is performed at an electronic device (e.g., the electronic device 124 shown in FIGS. 1 and 11; the controller 102 in FIGS. 1 and 10; or a suitable combination thereof) with one or more processors, a non-transitory memory, and one or more displays. In some implementations, the method 1000 is performed by processing logic, including hardware, firmware, software, or a combination thereof. In some implementations, the method 1000 is performed by a processor executing code stored in a non-transitory computer-readable medium (e.g., a memory). In some implementations, the electronic device corresponds to at least one of a near-eye system, a mobile phone, or a tablet.

As represented by block 1010, the method 1000 includes while presenting reference CGR content via the one or more displays, obtaining a request from a user to invoke a target state for the user. In some implementations, obtaining the target state to invoke for the user includes determining whether the user provided informed consent to store the user information in the user model associated with the user of the device. In some implementations, for example as shown in FIG. 4, the data processing architecture 400 includes a privacy subsystem 420 that includes one or more privacy setting filters associated with user information, such as audio data 402A, physiological measurements 402B, body pose data 402C, eye tracking data 402D, and/or other identifying information. In some implementations, the privacy subsystem 420 includes an opt-in feature where the device informs the user as to what user information and/or identifying information is being monitored and how the user information and/or the identifying information is being used.

In some implementations, the privacy subsystem 420 ensures that the user model (e.g., the user model 460 shown in FIG. 5) and the trained neural network (e.g., the trained neural network 516 shown in FIG. 5) are not accessible to other applications and/or users. In some implementations, the privacy subsystem 420 selectively prevents and/or limits the data processing architecture 400 or portions thereof from obtaining and/or transmitting the user information. To this end, the privacy subsystem 420 receives user preferences and/or selections from the user in response to prompting the user for the same. In some implementations, the privacy subsystem 420 prevents the data processing architecture 400 from obtaining and/or transmitting the user information unless and until the privacy subsystem 420 obtains informed consent from the user. In some implementations, the privacy subsystem 420 anonymizes (e.g., scrambles or obscures) certain types of user information. For example, the privacy subsystem 420 receives user inputs designating which types of user information the privacy subsystem 420 anonymizes. As another example, the privacy subsystem 420 anonymizes certain types of user information likely to include sensitive and/or identifying information, independent of user designation (e.g., automatically).

As represented by block 1020, the method 1000 includes generating, based on a user model (e.g., the user model 700 shown in FIG. 7) associated with the user and the reference content, modified CGR content to invoke the target state for the user, wherein the user model provides projected CGR content to the modified CGR content. In some implementations, the user model correlates the CGR content to projected reactions of the user. In some implementations, the method further comprises generating the user model based at least in part on a first resultant reaction by the user to first CGR content, and a second resultant reaction by the user to second CGR content. As an example, as shown in FIG. 7, the first resultant reaction for a first CGR content of a virtual agent with a happy expression corresponds to a resultant state of happy in the first entry 701 and the second resultant reaction for a second CGR content of a virtual agent with a frowning expression corresponds to a resultant state of scared in the third entry 705. In some implementations, the modified CGR content corresponds to at least one of predetermined CGR content and emergent CGR content.

In some implementations, generating the modified CGR content includes selecting a portion of the user model based at least in part on a measured state and a target state. For example, in FIG. 8C, the measured state of the user is happy and the electronic device 124 and/or the controller receives a request to invoke a target state of scared for the user 150.

As such, electronic device 124 and/or the controller 102 searches for a pre-existing entry in the user model where the measured state matches the resultant state, the target state matches the resultant state, and the CGR content is closely related to the currently presented CGR content in order to invoke the target state of scared for the user 150. Continuing with the example, with reference to FIG. 7, the third entry 705 includes a measured state of happy, a target state of scared, CGR content of a virtual agent with a frowning expression, a resultant state of scared, and a count of 1. As such, the electronic device 124 presents a virtual agent with a frowning expression 809 based on the selecting a portion of the user model (e.g., the measured state of happy and the target state of scared from the third entry 705) in order to invoke the target state of scared for the user 150.

In some implementations, generating the modified CGR content includes adding CGR content to the reference CGR content based at least in part on the user model. For example, if the user 150 is known to like animals based on the user model, then the electronic device 124 and/or the controller 102 may add CGR content relating to animals to the reference CGR content. In some implementations, generating the modified CGR content includes scaling CGR content associated with the reference CGR content based at least in part on the user model. For example, if the user 150 is known to dislike or be afraid of spiders based on the user model and if the electronic device 124 and/or the controller 102 obtains a request from the user 150 to be frightened, the electronic device 124 and/or the controller 102 may modify CGR content associated with a spider by scaling-up the modified CGR content spider in order to scare the user 150. In some implementations, generating the modified CGR content includes modifying a set of available interactions associated with the reference CGR content based at least in part on the user model. In another example, if the user 150 is known to enjoy dancing based on the user model and if the electronic device 124 and/or the controller 102 obtains a request from the user 150 to be happy, the electronic device 124 and/or the controller 102 may modify a set of available interactions associated with a cartoon bear such as tapping the cartoon bear to cause the cartoon bear to twirl in a circle in order to make the user 150 happy.

As represented by block 1030, the method 1000 includes presenting, via the one or more displays, the modified CGR content. In some implementations, if the electronic device corresponds to a near-eye system, then the modified CGR content may be composited with video pass-through content of the live scene. In some implementations, if the one or more displays 122 corresponds to an additive display that enables optical see-through of the physical environment, then electronic device 124 presents modified CGR content by projecting or displaying the modified CGR content on the additive display, which is, in turn, overlaid on the physical environment from the perspective of the user.

In some implementations, the method 1000 further includes after presenting the modified CGR content to the user: obtaining sensor information associated with the user, wherein the sensor information corresponds to one or more physiological measurements of the user; determining, using a qualitative mood classifier, a resultant state of the user based on the sensor information associated with the user; and updating the user model based at least in part on the resultant state of the user and the modified CGR content. In some implementations, the method further includes obtaining the sensor information associated with the user via one or more sensors of the electronic device. For example with reference to FIG. 8B, after the electronic device 124 presents the virtual agent with the happy expression 807 to the user 150, the electronic device 124 obtains sensor information such as physiological measurements including a heart rate of 90 BPM, pupil dilation diameter of 3.0 mm and body pose data indicating the user with his/her arms down. Next, the electronic device 124 and/or the controller 102 uses the sensor information and the qualitative mood classifier to determine that the resultant state of the user is happy. Continuing with the example, the electronic device 124 updates the user model by associating the virtual agent with the happy expression 807 and the resultant state of happiness in an entry in the user model.

In some implementations, the one or more physiological measurements of the user include at least one of eye tracking information, pupil dilation diameter information, body pose characteristics, speech characteristics, heart rate, glucose level, and blood oximetry. In some implementations, the method further includes determining the resultant state of the user by determining whether a user provided informed consent to monitor one or more physiological modalities associated with the user information.

In some implementations, the reference CGR content corresponds to a virtual agent. In some implementations, generating modified reference CGR content includes changing an expression of the virtual agent. For example, with reference to FIGS. 8A and 8B, the reference CGR content corresponds to a virtual agent with a neutral expression 806 and the electronic device 124 and/or the controller 102 obtains a request to invoke a target state of happiness of the user 150. Continuing with the example, in FIG. 8B, the electronic device 124 and/or the controller 102 modifies the virtual agent by changing the expression of the virtual agent to a virtual agent with the happy expression 807 in order to invoke the target state of happiness of the user 150. In some implementations, generating modified reference CGR content includes changing one or more actions of the virtual agent.

In some implementations, the method 1000 further includes obtaining user information from the user model associated with the user of the device stored on a secure local non-transitory memory of the electronic device. For example, with reference to FIG. 5, in some implementations, the electronic device 124 and/or the controller 102 obtains user information from the user model 460 from a secure local non-transitory memory of the electronic device. In some implementations, the method 1000 further includes storing user information in the user model associated with the user of the device to a secure local non-transitory memory of the electronic device, wherein the user model is stored in the secure local non-transitory memory of the electronic device. For example, with reference to FIG. 5, in some implementations, the electronic device 124 and/or the controller 102 stores the user model 460 from a secure local non-transitory memory of the electronic device. In some implementations, the method 1000 further includes randomizing user information in the user model associated with the user of the user device before storing the user information in the user model associated with the user of the electronic device in a secure local non-transitory memory of the electronic device that is not accessible to other applications and/or users. For example, with reference to FIG. 5, in some implementations, the electronic device 124 and/or the controller 102 randomizes the user model 460 before storing the user model 460 associated with the user of the electronic device in a secure local non-transitory memory of the electronic device that is not accessible to other applications and/or users.

In some implementations, the method 1000 further includes obtaining a training data corpus that includes a plurality of sensor information sets, wherein each of the plurality of sensor information sets is associated with a respective state of the user, wherein each of the plurality sensor information sets is associated with respective one or more qualitative mood indicator values; generating, using a qualitative mood classifier, at least one candidate qualitative mood indicator value corresponding to a portion of the plurality of sensor information sets; comparing the at least one candidate qualitative mood indicator value against a corresponding qualitative mood indicator value within the training data corpus; in response to determining that a result of the comparison between the at least one candidate mood indicator value against the corresponding qualitative mood indicator value does not satisfy an error metric, changing an operational value of the qualitative mood classifier; and in response to determining that a result of the comparison between the at least one candidate qualitative mood indicator value against the corresponding qualitative mood indicator value satisfies the error metric and that a sufficient portion of the training data corpus is utilized, outputting a convergence indicator associated with the qualitative mood classifier. In some implementations, the qualitative mood classifier corresponds to a neural network. The feature and components of training the qualitative mood classifier are discussed in greater detail above with respect to FIG. 2.

Figure 11:
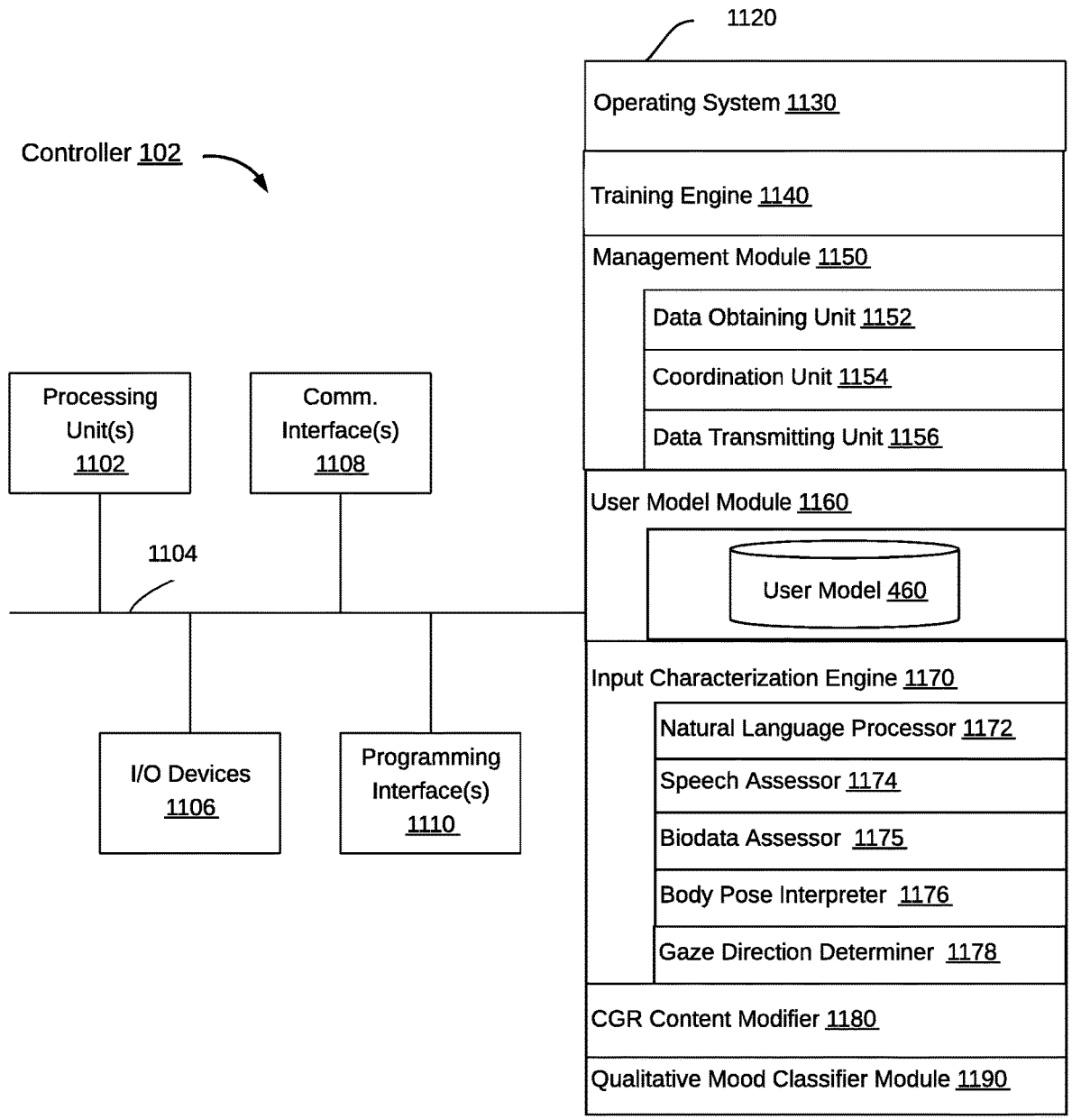
FIG. 11 is a block diagram of an example controller in accordance with some implementations.

FIG. 11 is a block diagram of an example controller (e.g., the controller 102 shown in FIG. 1) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the controller 102 includes one or more processing units 1102 (e.g., microprocessors, application-specific integrated-circuits (ASICs), field-programmable gate arrays (FPGAs), graphics processing unit (GPUs), central processing units (CPUs), processing cores, and/or the like), one or more input/output (I/O) devices and sensors 1106, one or more communications interface 1108 (e.g., universal serial bus (USB), IEEE 802.3x, IEEE 802.11x, IEEE 802.16x, global system for mobile communications (GSM), code division multiple access (CDMA), time division multiple access (TDMA), global positioning systems (GPS), infrared (IR), BLUETOOTH, ZIGBEE, and/or the like type interfaces), one or more programming (e.g., I/O) interfaces 1110, a memory 1120, and one or more communication buses 1104 for interconnecting these and various other components.

In some implementations, the one or more communication buses 1104 include circuitry that interconnects and controls communications between system components. In some implementations, the one or more I/O devices and sensors include at least one of a keyboard, a mouse, a touchpad, a joystick, one or more microphones, one or more speakers, one or more image sensors, one or more displays, and/or the like.

The memory 1120 includes high-speed random-access memory, such as DRAM, SRAM, DDR, RAM, or other random-access solid-state memory devices, and may include non-volatile memory, such as one or more magnetic disk storage devices, optical disk storage devices, flash memory devices, or other non-volatile solid-state storage devices. The memory 1120 optionally includes one or more storage devices remotely located from the one or more processing units 1102. The memory 1120 comprises a non-transitory computer readable storage medium. In some implementations, the memory 1120 or the non-transitory computer readable storage medium of the memory 1120 stores the following programs, modules, and data structures, or a subset thereof including an operating system 1130, a training engine 1140, a management module 1150, a user model module 1160, an input characterization engine 1170, a CGR content modifier 1180, and a qualitative mood classifier module 1190. In some implementations, one or more instructions are included in a combination of logic and non-transitory memory.

The operating system 1130 includes procedures for handling various basic system services and for performing hardware-dependent tasks.

In some implementations, the training engine 1140 is configured to train the various portions of the neural network 222 (e.g., the neural network 222 shown in FIGS. 2 and 3). To that end, in various implementations, training engine 1140 includes instructions and/or logic therefor, and heuristics and metadata therefor.

In some implementations, the management module 1150 is configured to render, manage, and/or coordinate one or more user experiences (e.g., the CGR environment 128 shown in FIG. 1, the user interface 802 shown in FIGS. 8A-8C, or the user interface 902 shown in FIGS. 9A-9D) for one or more devices associated with different users. To that end, in various implementations, the management module 1150 includes a data obtaining unit 1152, a coordination unit 1154, and a data transmitting unit 1156.

In some implementations, the data obtaining unit 1152 is configured to obtain data (e.g., presentation data, user interaction data, sensor data, location data, etc.) from at least the electronic device 124 shown in FIGS. 1, 6, 8A-8C, and 9A-9D. To that end, in various implementations, the data obtaining unit 1152 includes instructions and/or logic therefor, and heuristics and metadata therefor.

In some implementations, the coordination unit 1154 is configured to manage and coordinate the CGR experiences presented to the user by at least the electronic device 124 shown in FIGS. 1, 6, 8A-8C, and 9A-9D. To that end, in various implementations, the coordination unit 1154 includes instructions and/or logic therefor, and heuristics and metadata therefor.

In some implementations, the data transmitting unit 1156 is configured to transmit data (e.g., presentation data, location data, etc.) to at least the electronic device 124 shown in FIGS. 1, 6, 8A-8C, and 9A-9D. To that end, in various implementations, the data transmitting unit 1156 includes instruction and/or logic therefor, and heuristics and metadata therefor.

In some implementations, the user model module 1160 is configured to manage the user model (e.g., the user model 460 shown in FIG. 4 or the user model 700 shown in FIG. 7) by adding entries to the user model, updating entries in the user model, and searching for matches between a pair of measured state and target state to a pair of measured state and resultant state pre-existing entry in the user model. In some implementations, the user model module 1160 includes a user model (e.g., the user model 460 shown in FIG. 4 or the user model 700 shown in FIG. 7). To that end, in various implementations, the user model module 1160 includes instructions and/or logic therefor, and heuristics and metadata therefor.

In some implementations, the input characterization engine 1170 is configured to generate an input characterization vector (e.g., the input characterization vector 302 shown in FIG. 3 and the input characterization vector 470 shown in FIG. 4B) based on input data (e.g., audio data, body pose data, and eye tracking data, which are sometimes collectively referred to herein as "sensor data") obtained from sensors and/or input devices of the controller 102, the electronic device 124, and/or the optional remote input devices. To that end, in various implementations, the input characterization engine 1170 includes a natural language processor (NLP) 1172, a speech assessor 1174, a body pose interpreter 1176, and a gaze direction determiner 1178.

In some implementations, the input characterization vector (e.g., the input characterization vector 470 shown in FIG. 4B) includes a dialogue portion 482 that corresponds to the output from the NLP 1172. In some implementations, the input characterization vector 302 includes a dialogue delivery portion 484 that corresponds to the output from the speech assessor 1174. In some implementations, the input characterization vector 302 includes a physiological measurements portion 486 that corresponds to the output from the biodata assessor 1175. In some implementations, the input characterization vector includes a body pose portion 488 that corresponds to the output from the body pose interpreter 1176. In some implementations, the input characterization vector includes a gaze direction portion 490 that corresponds to the output from the gaze direction determiner 1178.

In some implementations, the NLP 1172 is configured to perform natural language processing (or another speech recognition technique) on audio data in order to generate the dialogue portion of the input characterization vector. To that end, in various implementations, the NLP 1172 includes instructions and/or logic therefor, and heuristics and metadata therefor.

In some implementations, the speech assessor 1174 is configured to determine one or more speech characteristics associated with the audio data (e.g., intonation, cadence, accent, diction, articulation, pronunciation, and/or the like) in order to generate the dialogue delivery portion of the input characterization vector. To that end, in various implementations, the speech assessor 1174 includes instructions and/or logic therefor, and heuristics and metadata therefor.

In some implementations, the biodata assessor 1175 is configured to determine one or more physiological measurements associated with the user in order to generate the physiological measurements portion of the input characterization vector. To that end, in various implementations, the biodata assessor 1175 includes instructions and/or logic therefor, and heuristics and metadata therefor.

In some implementations, the body pose interpreter 1176 is configured to determine one or more pose characteristics associated with the body pose data in order to generate the body pose portion of the input characterization vector. To that end, in various implementations, the body pose interpreter 1176 includes instructions and/or logic therefor, and heuristics and metadata therefor.

In some implementations, the gaze direction determiner 1178 is configured to determine a directionality vector associated with the eye tracking data (e.g., X, Y, and/or focal point coordinates) in order to generate the gaze direction portion of the input characterization vector. To that end, in various implementations, the gaze direction determiner 1178 includes instructions and/or logic therefor, and heuristics and metadata therefor.

In some implementations, the CGR content modifier 1180 is configured to modify the CGR content from reference CGR content based at least in part on the user model. To that end, in various implementations, the CGR content modifier 1180 includes instructions and/or logic therefor, and heuristics and metadata therefor.

In some implementations, the qualitative mood classifier module 1190 is configured to obtain the input data (e.g., the audio data 402A, the physiological measurements 402B, the body pose data 402C, and the eye tracking data 402D shown in FIG. 4), analyze the input data through the trained neural network (e.g., the trained neural network 516), and determine the resultant reaction of the user (or the resultant state 304 shown in FIG. 3) to a modified CGR content. To that end in various implementations, the qualitative mood classifier module 1190 includes instructions and/or logic therefor, and heuristics and metadata therefor.

Although the training engine 1140, the management module 1150, the user model module 1160, the input characterization engine 1170, the CGR content modifier 1180, and the qualitative mood classifier module 1190 are shown as residing on a single device (e.g., the controller 102), it should be understood that in some implementations, any combinations of the training engine 1140, the management module 1150, the user model module 1160, the input characterization engine 1170, the CGR content modifier 1180, and the qualitative mood classifier module 1190 may be located in separate computing devices.

In some implementations, the functionalities of the controller 102 are provided by and/or combined with the electronic device 124. Moreover, FIG. 11 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 11 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation. In some implementations, the functions and/or components of the controller 102 are combined with or provided by the electronic device 124 shown below in FIG. 12.

Figure 12:
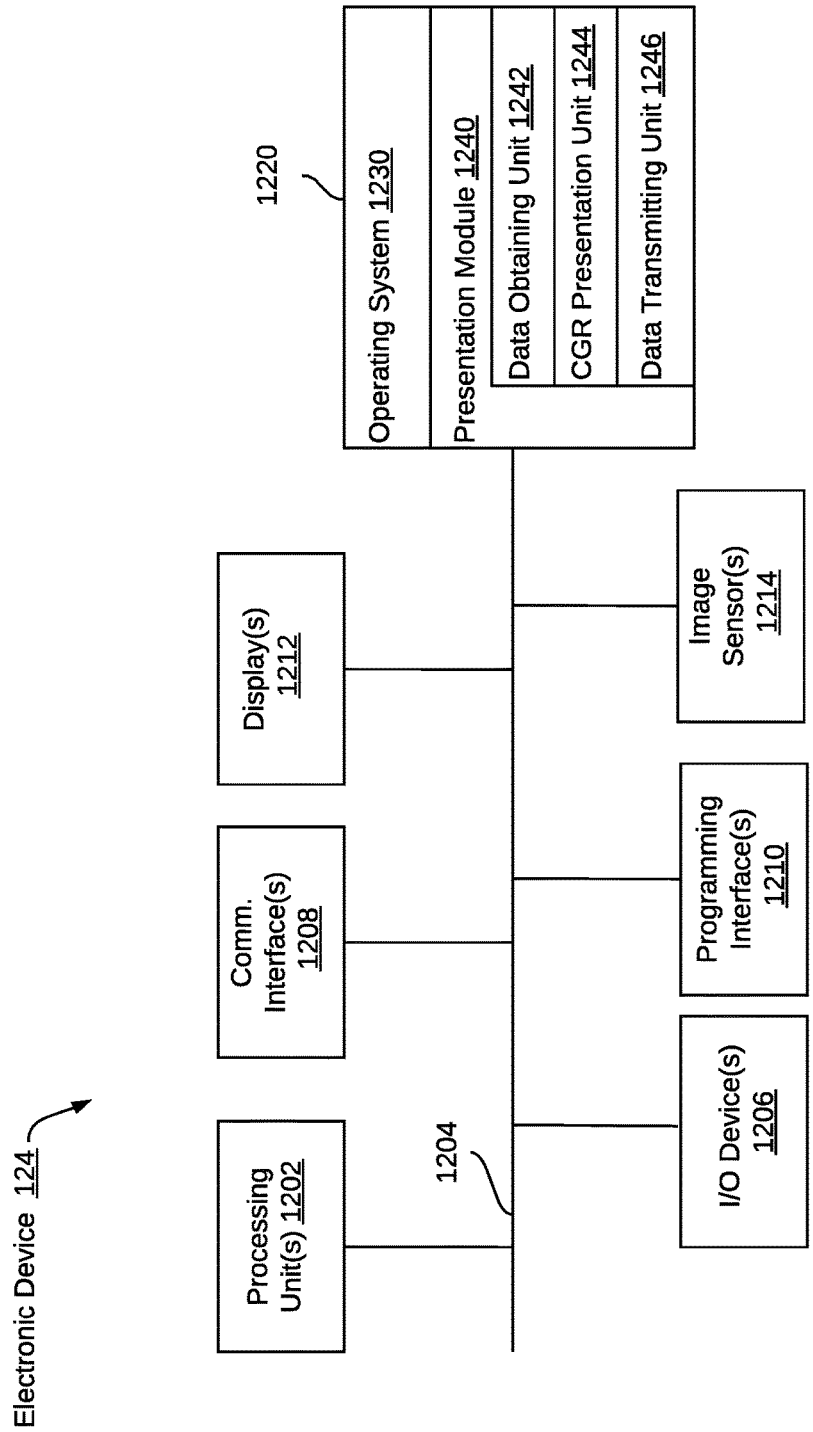
FIG. 12 is a block diagram of an example electronic device in accordance with some implementations.

FIG. 12 is a block diagram of an example electronic device 124 (e.g., a mobile phone, tablet, laptop, near-eye system, etc.) in accordance with some implementations. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the electronic device 124 includes one or more processing units 1202 (e.g., microprocessors, ASICs, FPGAs, GPUs, CPUs, processing cores, and/or the like), one or more I/O devices and sensors 1206, one or more communications interfaces 1208 (e.g., USB, IEEE 802.3x, IEEE 802.11x, IEEE 802.16x, GSM, CDMA, TDMA, GPS, IR, BLUETOOTH, ZIGBEE, and/or the like type interfaces), one or more programming interfaces 1210, one or more displays 1212, one or more image sensors 1214, a memory 1220, and one or more communication buses 1204 for interconnecting these and various other components.

In some implementations, the one or more communication buses 1204 include circuitry that interconnects and controls communications between system components. In some implementations, the one or more I/O devices and sensors 1206 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, and/or the like.

In some implementations, the one or more displays 1212 are capable of presenting one or more CGR experiences (e.g., the CGR experience 130 shown in FIG. 2, the user interface 802 shown in FIGS. 8A-8C, or the user interface 902 shown in FIGS. 9A-9C). In some implementations, the one or more displays 1212 are also configured to present flat video content to the user (e.g., a 2-dimensional or "flat" audio video interleave (AVI), flash video (FLV), Windows Media Video (WMV), or the like file associated with a TV episode or a movie, or live video pass-through of the operating environments. In some implementations, the one or more displays 1212 correspond to an additive display, holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro mechanical systems (MEMS), and/or the like display types. In some implementations, the one or more displays 1212 correspond to diffractive, reflective, polarized, holographic, etc. waveguide displays. For example, the electronic device 124 includes a single display. In another example, the electronic device 124 includes a display for each eye of the user.

In some implementations, the one or more image sensors 1214 are configured to obtain image data frames. For example, the one or more image sensors 1214 correspond to one or more RGB cameras (e.g., with a CMOS image sensor, or a CCD image sensor), infrared (IR) image sensors, event-based cameras, and/or the like.

The memory 1220 includes high-speed random-access memory, such as DRAM, SRAM, DDR RAM, or other random-access solid-state memory devices. In some implementations, the memory 1220 includes non-volatile memory, such as one or more magnetic disk storage devices, optical disk storage devices, flash memory devices, or other non-volatile solid-state storage devices. The memory 1220 optionally includes one or more storage devices remotely located from the one or more processing units 1202. The memory 1220 comprises a non-transitory computer readable storage medium. In some implementations, the memory 1220 or the non-transitory computer readable storage medium of the memory 1220 stores the following programs, modules and data structures, or a subset thereof including an optional operating system 1230, and a presentation module 1240.

The optional operating system 1230 includes procedures for handling various basic system services and for performing hardware dependent tasks. In some implementations, the presentation module 1240 is configured to present user interfaces or CGR content to the user via the one or more displays 1212. To that end, in various implementations, the presentation module 1240 includes a data obtaining unit 1242, a CGR presentation unit 1244, and a data transmitting unit 1246.

In some implementations, the data obtaining unit 1242 is configured to obtain data (e.g., presentation data, interaction data, location data, etc.) from at least one of the one or more I/O devices and sensors 1106 associated with the electronic device 124 or the controller 102 shown in FIGS. 1 and 11. To that end, in various implementations, the data obtaining unit 1242 includes instructions and/or logic therefor, and heuristics and metadata therefor.

In some implementations, the CGR presentation unit 1244 is configured to present one or more CGR experiences (e.g., the CGR experience 130 shown in FIG. 2, the user interface 802 shown in FIGS. 8A-8C, or the user interface 902 shown in FIGS. 9A-9C) via the one or more displays. To that end, in various implementations, the CGR presentation unit 1244 includes instructions and/or logic therefor, and heuristics and metadata therefor.

In some implementations, the data transmitting unit 1246 is configured to transmit data (e.g., presentation data, location data, etc.) to the controller 102 shown in FIGS. 1 and 11. To that end, in various implementations, the data transmitting unit 1246 includes instructions and/or logic therefor, and heuristics and metadata therefor.

Although the data obtaining unit 1242, the CGR presentation unit 1244, and the data transmitting unit 1246 are shown as residing on a single device (e.g., the electronic device 124 shown in FIGS. 1, 6, 8A-8C, and 9A-9D), it should be understood that in some implementations, any combination of the data obtaining unit 1242, the CGR presentation unit 1244, and the data transmitting unit 1246 may be located in separate computing devices. In some implementations, the functions and/or components of the controller 102 are combined with or provided by the electronic device 124.

Moreover, FIG. 12 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 12 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first CGR content could be termed a second CGR content, and, similarly, a second CGR content could be termed a first CGR content, which changing the meaning of the description, so long as the occurrences of the "first CGR content" are renamed consistently and the occurrences of the "second CGR content" are renamed consistently. The first CGR content and the second CGR content are both CGR contents, but they are not the same CGR content.

The terminology used herein is for the purpose of describing particular implementations only and is not intended to be limiting of the claims. As used in the description of the implementations and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
    at an electronic device including one or more processors, a non-transitory memory, and one or more displays:
        while presenting reference computer-generated reality (CGR) content via the one or more displays, obtaining a request from a user to invoke a target state for the user;
        in response to obtaining the request from the user, generating, based on a user model associated with the user and the reference CGR content, first modified CGR content to invoke the target state for the user, wherein the user model provides projected reactions to the first modified CGR content;
        presenting, via the one or more displays, the first modified CGR content;
        after presenting the modified CGR content, determining, using a qualitative mood classifier, a resultant state of the user;
        in accordance with a determination that the resultant state of the user corresponds to the target state for the user, updating the user model to indicate that the first modified CGR content successfully invoked the target state for the user; and
        in accordance with a determination that the resultant state of the user does not correspond to the target state for the user, updating the user model to indicate that the first modified CGR content did not successfully invoke the target state for the user.

2. The method of claim 1, further comprising:
    in accordance with a determination that the resultant state of the user does not correspond to the target state for the user:
        generating, based on the user model associated with the user and the reference CGR content, second modified CGR content to invoke the target state for the user; and
        presenting, via the one or more displays, the second modified CGR content.

3. The method of claim 1, further comprising:
    after presenting the modified CGR content to the user, obtaining sensor information associated with the user, wherein the sensor information corresponds to at least one of body pose data, head pose data, or eye tracking data associated with the user, wherein the resultant state of the user is determined based on the sensor information.

4. The method of claim 1, further comprising:
    after presenting the modified CGR content to the user, obtaining sensor information associated with the user, wherein the sensor information corresponds to one or more physiological measurements of the user, wherein the resultant state of the user is determined based on the sensor information.

5. The method of claim 4, wherein the one or more physiological measurements of the user include at least one of eye tracking information, pupil dilation information, body pose characteristics, speech characteristics, heart rate, glucose level, and blood oximetry.

6. The method of claim 4, wherein determining the resultant state of the user based on the sensor information includes determining whether the user provided informed consent to monitor one or more physiological modalities associated with the user.

7. The method of claim 1, wherein the reference CGR content corresponds to a virtual agent.

8. The method of claim 7, wherein generating the first modified CGR content includes at least one of changing an expression of the virtual agent or changing one or more actions of the virtual agent.

9. The method of claim 1, wherein generating the first modified CGR content includes adding CGR content to the reference CGR content based at least in part on the user model.

10. The method of claim 1, wherein generating the first modified CGR content includes scaling CGR content associated with the reference CGR content based at least in part on the user model.

11. The method of claim 1, wherein generating the first modified CGR content includes modifying a set of available interactions associated with the reference CGR content based at least in part on the user model.

12. The method of claim 1, wherein obtaining the request from the user to invoke the target state for the user includes determining whether the user provided informed consent to store user information in the user model associated with the user of the device.

13. An electronic device comprising:
    one or more processors;
    one or more displays;
    a non-transitory memory; and
    one or more programs stored in the non-transitory memory, which, when executed by the one or more processors, cause the device to:

while presenting reference computer-generated reality (CGR) content via the one or more displays, obtain a request from a user to invoke a target state for the user;

in response to obtaining the request from the user, generate, based on a user model associated with the user and the reference CGR content, first modified CGR content to invoke the target state for the user, wherein the user model provides projected reactions to the first modified CGR content;

present, via the one or more displays, the first modified CGR content;

after presenting the modified CGR content, determine, using a qualitative mood classifier, a resultant state of the user;

in accordance with a determination that the resultant state of the user corresponds to the target state for the user, update the user model to indicate that the first modified CGR content successfully invoked the target state for the user; and in accordance with a determination that the resultant state of the user does not correspond to the target state for the user, update the user model to indicate that the first modified CGR content did not successfully invoke the target state for the user.

14. The electronic device of claim 13, wherein the one or more programs further cause the device to:

in accordance with a determination that the resultant state of the user does not correspond to the target state for the user:

generate, based on the user model associated with the user and the reference CGR content, second modified CGR content to invoke the target state for the user; and present, via the one or more displays, the second modified CGR content.

15. The electronic device of claim 13, wherein the one or more programs further cause the device to:

after presenting the modified CGR content to the user, obtain sensor information associated with the user, wherein the sensor information corresponds to at least one of body pose data, head pose data, or eye tracking data associated with the user, wherein the resultant state of the user is determined based on the sensor information.

16. The electronic device of claim 13, wherein the one or more programs further cause the device to:

after presenting the modified CGR content to the user, obtain sensor information associated with the user, wherein the sensor information corresponds to one or more physiological measurements of the user, wherein the resultant state of the user is determined based on the sensor information.

17. The electronic device of claim 16, wherein the one or more physiological measurements of the user include at least one of eye tracking information, pupil dilation information, body pose characteristics, speech characteristics, heart rate, glucose level, and blood oximetry.

18. A non-transitory memory storing one or more programs, which, when executed by one or more processors of an electronic device with one or more displays, cause the device to:

while presenting reference computer-generated reality (CGR) content via the one or more displays, obtain a request from a user to invoke a target state for the user;

in response to obtaining the request from the user, generate, based on a user model associated with the user and the reference CGR content, first modified CGR content to invoke the target state for the user, wherein the user model provides projected reactions to the first modified CGR content;

present, via the one or more displays, the first modified CGR content;

after presenting the modified CGR content, determine, using a qualitative mood classifier, a resultant state of the user;

in accordance with a determination that the resultant state of the user corresponds to the target state for the user, update the user model to indicate that the first modified CGR content successfully invoked the target state for the user; and in accordance with a determination that the resultant state of the user does not correspond to the target state for the user, update the user model to indicate that the first modified CGR content did not successfully invoke the target state for the user.

19. The non-transitory memory of claim 18, wherein the one or more programs further cause the device to:

in accordance with a determination that the resultant state of the user does not correspond to the target state for the user:

generate, based on the user model associated with the user and the reference CGR content, second modified CGR content to invoke the target state for the user; and present, via the one or more displays, the second modified CGR content.

20. The non-transitory memory of claim 18, wherein the one or more programs further cause the device to:

after presenting the modified CGR content to the user, obtain sensor information associated with the user, wherein the sensor information corresponds to at least one of body pose data, head pose data, or eye tracking data associated with the user, wherein the resultant state of the user is determined based on the sensor information.

21. The non-transitory memory of claim 18, wherein the one or more programs further cause the device to:

after presenting the modified CGR content to the user, obtain sensor information associated with the user, wherein the sensor information corresponds to one or more physiological measurements of the user, wherein the resultant state of the user is determined based on the sensor information.

22. The non-transitory memory of claim 21, wherein the one or more physiological measurements of the user include at least one of eye tracking information, pupil dilation information, body pose characteristics, speech characteristics, heart rate, glucose level, and blood oximetry.

* * * * *